United States Patent
Berzin et al.

(10) Patent No.: US 9,642,032 B2
(45) Date of Patent: May 2, 2017

(54) THIRD PARTY INTERFACE FOR PROVISIONING BEARERS ACCORDING TO A QUALITY OF SERVICE SUBSCRIPTION

(71) Applicant: Verizon Patent and Licensing Inc., Arlington, VA (US)

(72) Inventors: Oleg Berzin, Huntingdon Valley, PA (US); Arvind Aggarwal, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 200 days.

(21) Appl. No.: 14/491,578

(22) Filed: Sep. 19, 2014

(65) Prior Publication Data

US 2015/0110044 A1 Apr. 23, 2015

Related U.S. Application Data

(63) Continuation-in-part of application No. 14/061,514, filed on Oct. 23, 2013.

(51) Int. Cl.
*H04W 28/02* (2009.01)
*H04L 12/859* (2013.01)
*H04W 76/02* (2009.01)
*H04W 8/18* (2009.01)
*H04L 12/723* (2013.01)

(52) U.S. Cl.
CPC ..... *H04W 28/0252* (2013.01); *H04L 47/2475* (2013.01); *H04W 28/0268* (2013.01); *H04W 76/025* (2013.01); *H04L 45/50* (2013.01); *H04W 8/18* (2013.01)

(58) Field of Classification Search
CPC ......... H04W 28/0252; H04W 28/0268; H04W 76/025; H04W 8/18; H04W 72/087; H04W 24/08; H04W 16/10; H04W 28/24; H04W 28/16; H04W 48/06; H04W 48/16; H04L 45/50; H04L 5/0064
See application file for complete search history.

(56) References Cited

U.S. PATENT DOCUMENTS

| | | | | |
|---|---|---|---|---|
| 8,761,091 B2* | 6/2014 | Zisimopoulos | ......... | H04L 47/14 370/230 |
| 8,824,412 B2* | 9/2014 | Zisimopoulos | ......... | H04L 47/14 370/235 |
| 9,288,816 B2* | 3/2016 | Paladugu | .............. | H04W 28/24 |

(Continued)

*Primary Examiner* — Brian O'Connor

(57) ABSTRACT

A provisioning system may receive requests, such as from third party service providers, to provision dedicated bearers for traffic associated with the service providers. For example, a service provider may request a particular quality of service ("QoS") level for traffic sent between the service provider and one or more user devices. This QoS level may be higher than a "normal" QoS level that is ordinarily provided. The provisioning system may establish a bearer, such as a dedicated non-guaranteed bitrate ("non-GBR") bearer between a packet data network ("PDN") gateway ("PGW") and the user device, and may transmit traffic, associated with the service provider, via the dedicated non-GBR bearer. A QoS agent, installed at the user device, may ensure that traffic, associated with the service provider, is sent from the user device via the dedicated non-GBR bearer (e.g., as opposed to another bearer with a lower QoS level).

16 Claims, 21 Drawing Sheets

(56) References Cited

U.S. PATENT DOCUMENTS

| | | | |
|---|---|---|---|
| 2014/0050168 A1* | 2/2014 | Zisimopoulos | H04L 47/14 370/329 |
| 2014/0064070 A1* | 3/2014 | Paladugu | H04L 47/2475 370/230 |
| 2014/0064071 A1* | 3/2014 | Paladugu | H04W 28/24 370/230 |
| 2016/0227467 A1* | 8/2016 | Tomici | H04W 48/16 |
| 2016/0234124 A1* | 8/2016 | Tomici | H04W 28/24 |

* cited by examiner

300 ⟶

| DSCP value(s) | Description | QCI |
|---|---|---|
| EF | Voice calls | 1* or 7 |
| AF41 | Video Calls | 7 |
| AF31, AF32, AF33 | Mission-critical data | 7 |
| AF21, AF22, AF23 | Transactional data | 8 |
| AF11, AF12, AF13 | Bulk data | 8 |
| CS6, CS7 | Network/Internet control | 8 |
| 0 | Best effort | 8 |

| DSCP class selector(s) | Description | QCI |
|---|---|---|
| 5 | Voice calls | 1* or 7 |
| 4 | Video Calls | 7 |
| 3 | Mission-critical data | 7 |
| 2 | Transactional data | 8 |
| 1 | Bulk data | 8 |
| 6, 7 | Network/Internet control | 8 |
| 0 | Best effort | 8 |

| QCI | MPLS traffic class |
|-----|--------------------|
| 1   | CoS1               |
| 7   | CoS2               |
| 8   | CoS3               |

FIG. 4

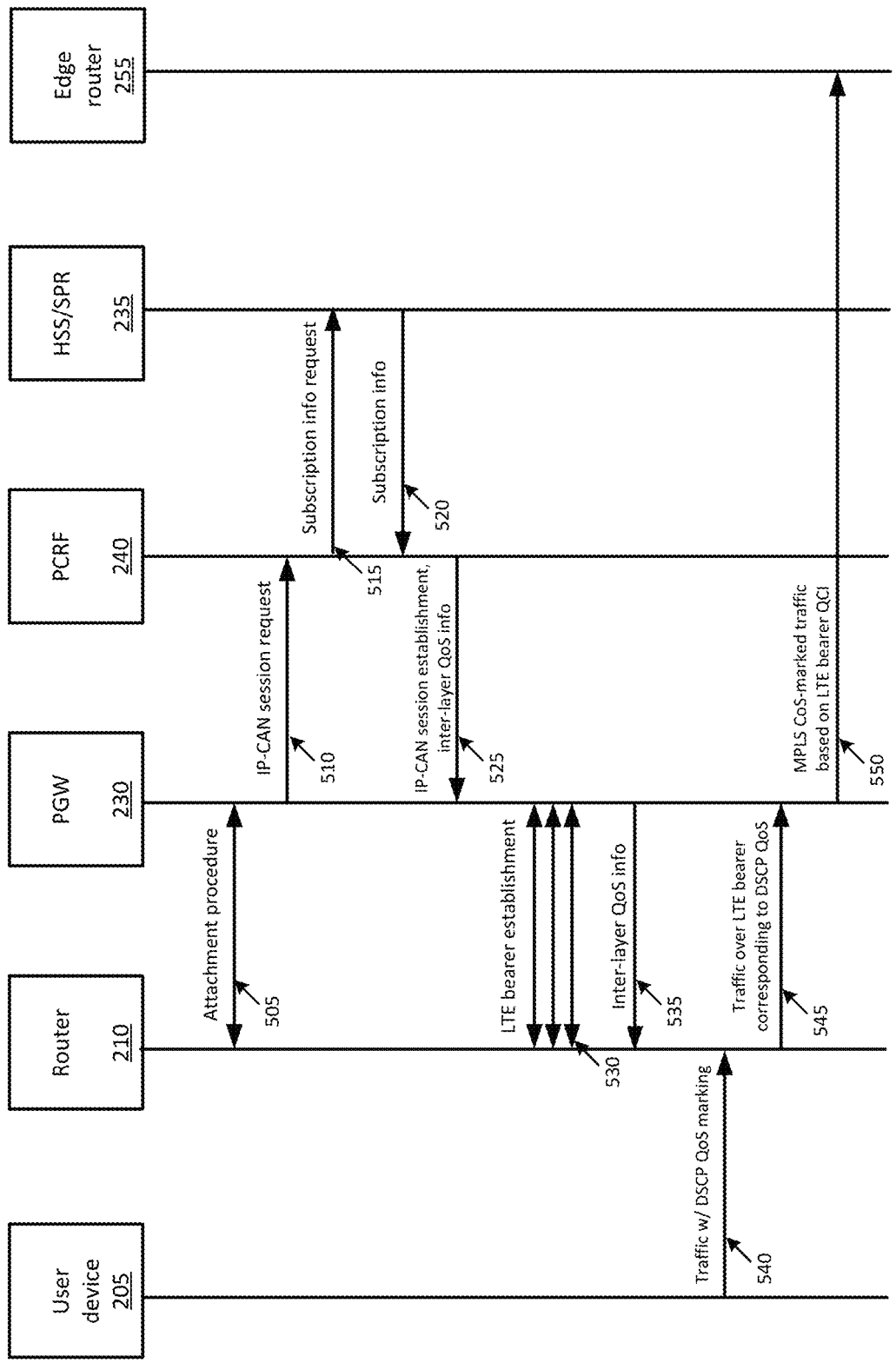

1200

| User Device ID | Application Server ID | QCI |
|---|---|---|
| UserDevice_A | AppServer_A | 1 |
| UserDevice_B | AppServer_B | 7 |
| UserDevice_B | AppServer_C | 2 |
| UserDevice_C | AppServer_A | 7 |
| UserDevice_C | AppServer_C | 7 |

| Application ID | DSCP value |
|---|---|
| Integrated voice call app | EF |
| Skipe | AF41 |
| Mall of Duty | AF31 |
| Integrated SMS app | AF21 |
| Interweb Exlorer | CS6 |

1510

| Traffic type | DSCP value |
|---|---|
| Voice calls | EF |
| Video Calls | AF41 |
| Mission-critical data | AF32 |
| Transactional data | AF23 |
| Bulk data | AF11 |
| Network/Internet control | CS6 |
| Best effort | 0 |

1520

| Application ID | Traffic type | DSCP value |
|---|---|---|
| Skipe | Voice calls | EF |
| Skipe | Instant messaging | AF41 |
| Mall of Duty | Real time gaming | AF31 |
| Mall of Duty | In-game voice chat | AF21 |

FIG. 15

THIRD PARTY INTERFACE FOR PROVISIONING BEARERS ACCORDING TO A QUALITY OF SERVICE SUBSCRIPTION

CROSS-REFERENCE TO RELATED APPLICATION

This application is a continuation-in-part of, and claims the benefit of priority of, U.S. patent application Ser. No. 14/061,514, titled "INTER-LAYER QUALITY OF SERVICE PRESERVATION" (filed Oct. 23, 2013), the contents of which are incorporated herein in their entirety.

BACKGROUND

Networks, such as wireless telecommunications networks, allow for communication between user devices (such as cellular telephones) and other devices (such as servers, other user devices, etc.). Traffic to and/or from user devices may traverse multiple different network devices, such as base stations and/or gateways, and links between the network devices. These network devices may each employ different techniques for ensuring quality of service ("QoS") for traffic associated with the user devices. These QoS techniques may be applied at different layers of the Open Systems Interconnection ("OSI") model. For example, an application may specify a level of QoS at the network layer (e.g., OSI layer 3). While a network may enforce the requested QoS at the network layer, a transport network may not necessarily apply a link layer (e.g., OSI layer 2) QoS that appropriately corresponds to the requested network layer QoS.

BRIEF DESCRIPTION OF THE DRAWINGS

FIGS. 3A, 3B, and 4 illustrate example data structures that may be stored and/or utilized by an Inter-Layer QoS engine, in accordance with some implementations;

FIGS. 5A, 5B, 6A, 6B, 7A, and 7B illustrate example signal flows for performing inter-layer QoS enforcement, in accordance with some implementations;

FIG. 12 illustrates an example data structure that may be stored by a subscriber profile repository ("SPR"), in accordance with some implementations;

FIG. 15 illustrates example data structures that may be stored by a QoS agent, in accordance with some implementations;

DETAILED DESCRIPTION OF PREFERRED EMBODIMENTS

The following detailed description refers to the accompanying drawings. The same reference numbers in different drawings may identify the same or similar elements.

User devices, such as wireless telephones, may send and receive traffic, such as traffic associated with voice calls, video calls, file transfer, control signaling, etc. Based on the type of application that traffic is associated with, a user device (and/or a router, via which the traffic is transmitted) may mark the traffic with a QoS marking (such as a network layer, (e.g., OSI layer 3), QoS marking), which may specify how the traffic should be treated, at the network level, by devices via which the traffic is routed. Even though some traffic may be marked with a desired network layer QoS, existing systems may fail to apply appropriate QoS treatment at other layers (e.g., at the link layer, or OSI layer 2).

Figure 1A:
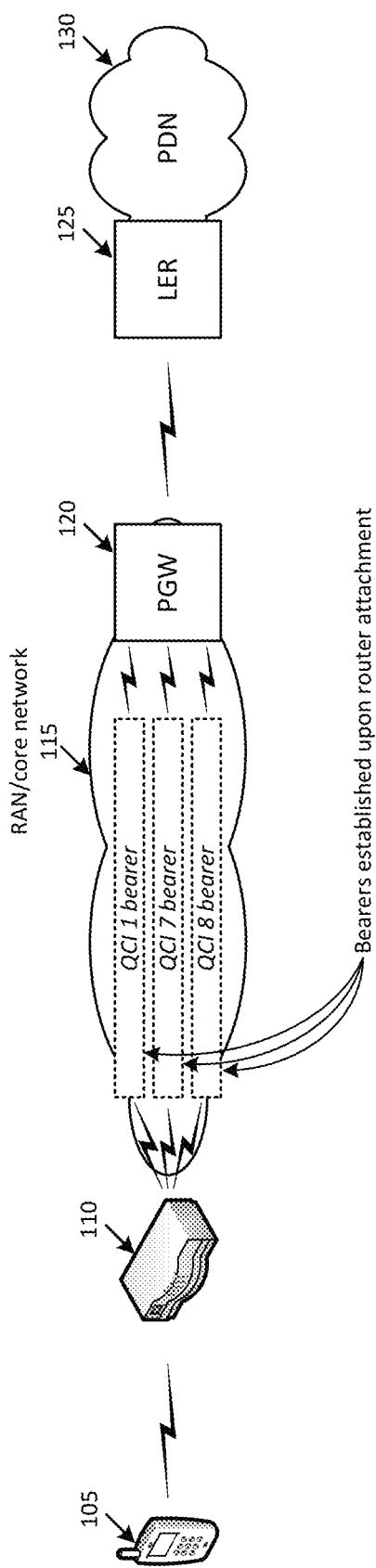
FIGS. 1A and 1B illustrate an example overview of one or more implementations described herein.

Some implementations described herein may allow for the identification of network layer QoS markings of traffic, and the application of link layer QoS treatment of the traffic based on the network layer QoS markings. For example, as shown in FIG. 1A, user device 105 may be communicatively coupled to packet data network ("PDN") 130 via router 110 and RAN/core network 115. Router 110 may include, for example, a mobile enterprise router, which communicates wirelessly with RAN/core network 115, which may include a Long Term Evolution ("LTE") network. Upon initial attachment of router 110 with RAN/core network 115 (and/or at another time), multiple bearers between router 110 and one or more devices of RAN/core network 115 (e.g., PDN gateway ("PGW") 120) may be established. These multiple bearers may each correspond to different link layer QoS levels. In the context of an LTE network, a link layer QoS level may be referred to as a QoS Class Identifier ("QCI"). As illustrated, one bearer may correspond to QCI 1, one bearer may correspond to QCI 7, and one bearer may correspond to QCI 8.

As described further below, router 110 may receive and/or store information that correlates network layer QoS levels to link layer QoS levels (e.g., QCIs). As also described further below, PGW 120 may receive and/or store information that correlates link layer QoS levels to Multiprotocol Label Switching ("MPLS") QoS levels (e.g., MPLS traffic classes).

Figure 1B:
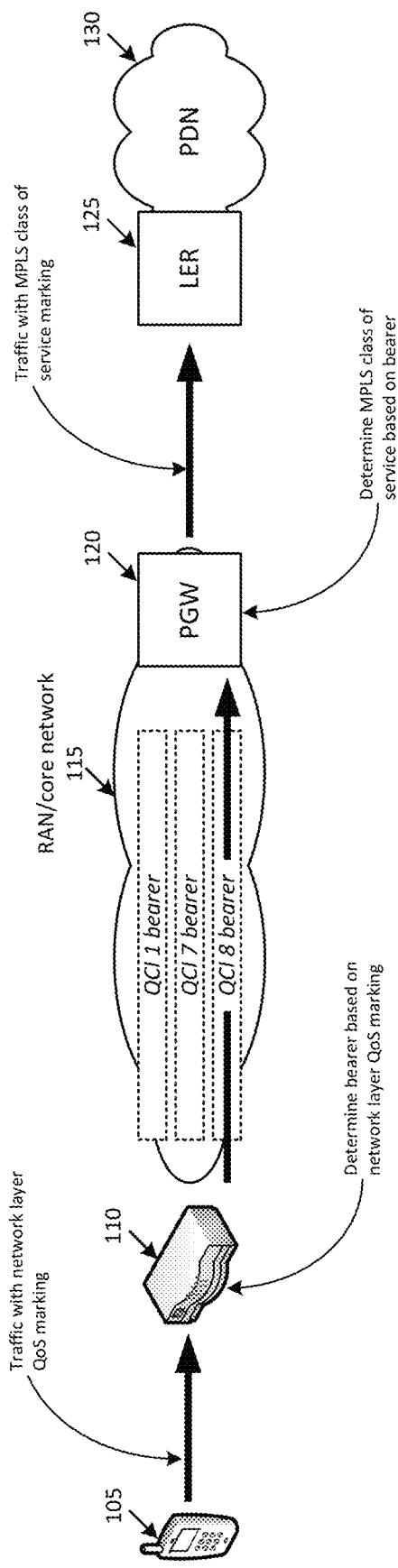

As shown in FIG. 1B, user device 105 may output traffic to PDN 130, via router 110 and RAN/core network 115. The traffic may include a network layer QoS marking such as, for example, a Differentiated Service ("DiffServ") Code Point ("DSCP") value in an Internet Protocol ("IP") header of the traffic. Router 110 may identify a QCI level associated with the DSCP value associated with the traffic and may output the traffic via the appropriate bearer. For example, as shown in FIG. 1B, router 110 may identify that the network layer QoS marking of the traffic is associated with QCI level 8, and may output the traffic to RAN/core network 115 via the associated bearer ("QCI 8 bearer," in FIG. 1B).

PGW 120 may identify an MPLS QoS level (e.g., MPLS traffic class) associated with the QCI level of the bearer via which the traffic was received. PGW 120 may mark the received traffic with an MPLS traffic class, such as by encapsulating the received traffic in one or more MPLS packets, and marking a "Traffic Class" field of a header of the MPLS packet(s) with the identified traffic class. PGW 120 may forward the MPLS packet(s) to PDN 130. One or more components of PDN 130, such as Label Edge Router ("LER") 125, may receive the MPLS packet(s), and may extract the original traffic (e.g., as outputted by user device 105). Elements of PDN 130 (such as LER 125 and/or other devices associated with PDN 130) may treat the extracted traffic according to the network layer QoS marking originally specified by user device 105.

In some implementations, inter-layer QoS treatment may be provided on a subscription basis. For example, router 110 may be an enterprise router owned by an enterprise-level customer who may have purchased a subscription to the inter-layer QoS treatment described above. As another example, in some implementations, individual user devices 105 may be associated with such a subscription, and may perform inter-layer QoS functions similar to those described above with respect to router 110. In some implementations, a provider of RAN/core network 115 may provide an application programming interface ("API"), which may allow a subscriber to specify correlations between network layer QoS levels (e.g., DSCP values) and link layer QoS levels (e.g., QCI levels).

By providing QoS treatment on a different layer than is specified by traffic itself, some implementations may allow for more consistent, predictable, and accurate end-to-end QoS treatment of traffic. Further, by providing the opportunity for subscribers to specify lower layer QoS levels that are associated with network layer QoS levels, some implementations described herein may provide a way for subscribers to have enhanced levels of access to lower layer QoS treatment mechanisms, which were not previously available. Some implementations described herein do not rely on the interworking between applications running on user devices and the associated application servers and/or application functions (with or without the use of Application Layer Gateways and/or APIs), residing inside or outside of the service provider's IMS infrastructure, to allow the applications to invoke link QoS levels. Instead, some implementations provide an application-independent method of mapping between network layer QoS levels and link layer QoS levels.

Figure 2:
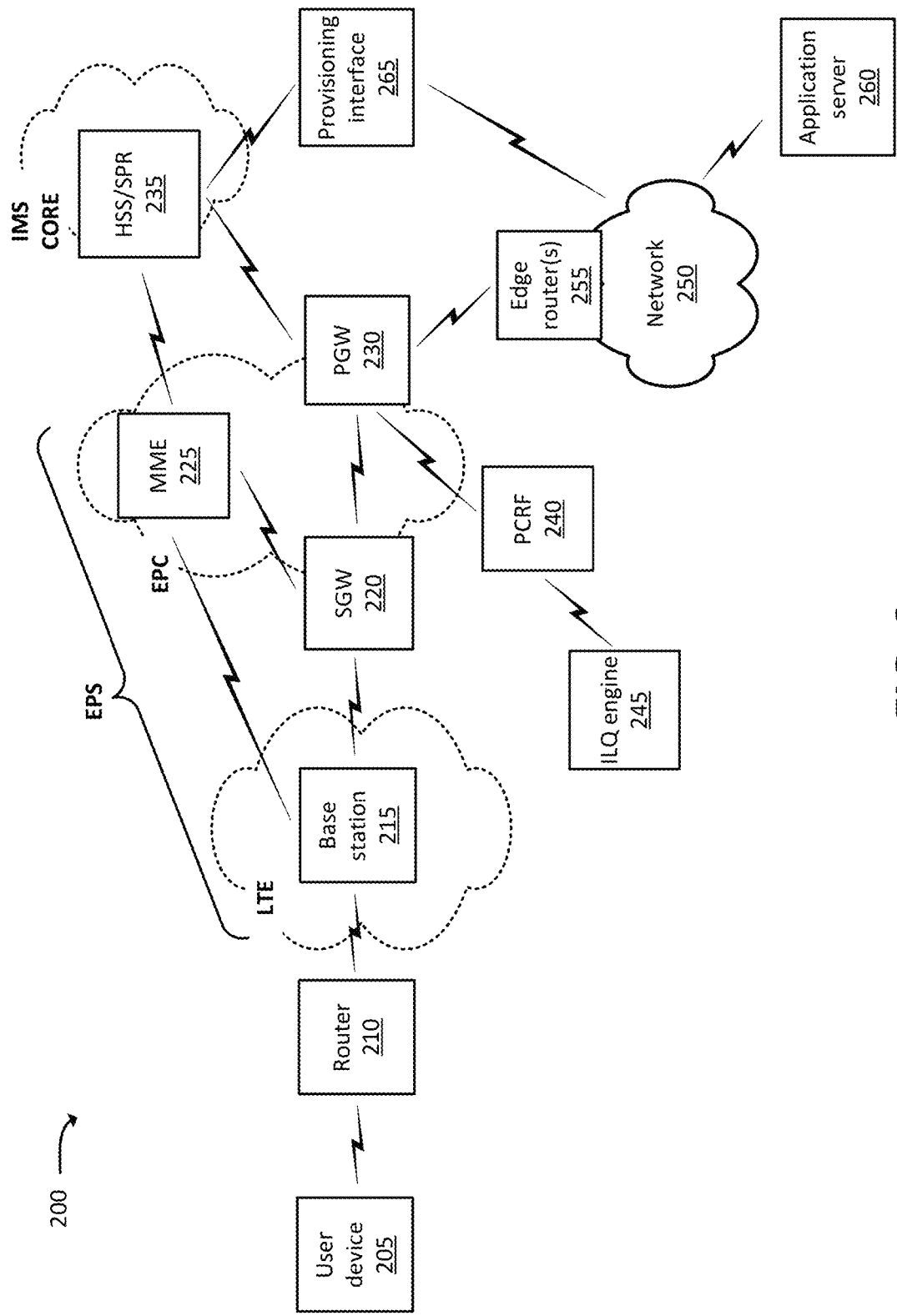
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user device 205, router 210, base station 215, serving gateway ("SGW") 220, mobility management entity device ("MME") 225, PGW 230, home subscriber server ("HSS")/SPR 235 (hereinafter referred to as "HSS/SPR 235"), policy charging and rules function ("PCRF") 240, inter-layer QoS engine 245 (hereinafter referred to as "ILQ engine 245"), network 250 (which may include one or more edge routers 255), application server 260, and provisioning interface 265.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system ("EPS") that includes an LTE network and/or an evolved packet core ("EPC") network that operate based on a third generation partnership project ("3GPP") wireless communication standard. The LTE network may be, or may include, a radio access network ("RAN") that includes one or more base stations 215, some or all of which may take the form of an eNodeB ("eNB"), via which user device 205 may communicate with the EPC network. The EPC network may include one or more SGWs 220, MMEs 225, and/or PGWs 230, and may enable user device 205 to communicate with network 250 and/or an IP multimedia subsystem ("IMS") core network. The IMS core network may include HSS/SPR 235, and may manage authentication, session initiation, account information, a user profile, etc. associated with user device 205.

User device 205 may include any computation and communication device, such as a wireless mobile communication device that is capable of communicating with one or more networks (e.g., network 250 and/or the IMS core). For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from network 250 and/or application server 260 via router 210, base station 215, SGW 220, PGW 230, and/or edge router 255.

Router 210 may include a network device that routes traffic received from user device 205 to an intended destination (e.g., to network 250) and/or routes traffic (e.g., traffic received from network 250) to user device 205. In some implementations, router 210 may communicate with base station 215 via, for example, a wireless connection (e.g., via one or more wireless bearers, such as LTE bearers). In some implementations, router 210 may communicate with user device 205 via a wireless connection, such as via a Bluetooth connection, an IEEE 802.11 connection (sometimes referred to as "Wi-Fi"), or another type of wireless connection. Router 210 may alternatively, or additionally, communicate with user device 205 via a wired connection.

Base station 215 may include one or more network devices that receive, process, and/or transmit traffic, such as calls, audio, video, text, and/or other data, destined for and/or received from user device 205. In one example, base station 215 may be an eNB device and may be part of the LTE network. Base station 215 may receive traffic from and/or send traffic to network 250 via SGW 220 and PGW 230. Base station 215 may send traffic to and/or receive traffic from user device 205 via an air interface.

SGW 220 may include one or more network devices that gather, process, search, store, and/or provide information. For example, SGW 220 may include a gateway, a router, a modem, a switch, a firewall, a network interface card ("NIC"), a hub, a bridge, a proxy server, and/or some other type of device that processes and/or transfers traffic. SGW 220 may, for example, aggregate traffic received from one or more base stations 215 and may send the aggregated traffic to network 250 via PGW 230.

MME 225 may include one or more computation and communication devices that gather, process, search, store, and/or provide information. For example, MME 225 may perform operations to register user device 205 with the EPS, to establish bearer channels associated with a session with user device 205, to hand off user device 205 from the EPS to another network, to hand off user device 205 from the other network to the EPS, and/or to perform other operations. MME 225 may perform policing operations on traffic destined for and/or received from user device 205.

PGW 230 may include one or more network devices, or other types of computation and communication devices, that gather, process, search, store, and/or provide information in a manner described herein. For example, PGW 230 may include a gateway, a router, a modem, a switch, a firewall, a network interface card ("NIC"), a hub, a bridge, a proxy server, an optical add-drop multiplexer ("OADM"), and/or some other type of device that processes and/or transfers traffic. PGW 230 may aggregate traffic received from one or more SGWs 220, and may send the aggregated traffic to network 250. PGW 230 may also, or alternatively, receive traffic from network 250 and may send the traffic toward user device 205 via SGW 220, and/or base station 215.

HSS/SPR 235 may include one or more server devices, or other types of devices, that gather, process, search, store, and/or provide information. For example, HSS/SPR 235 may manage, update, and/or store, in a memory associated with HSS/SPR 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with, for example, user device 205. Additionally, or alternatively, HSS/SPR 235 may perform authentication, authorization, and/or accounting operations associated with the subscriber and/or a communication session with user device 205.

PCRF 240 may include one or more server devices, or other types of devices, that aggregate information sent to and received from the EPC network and/or other sources. PCRF 240 may receive information regarding policies and/or subscriptions from one or more sources, such as subscriber databases and/or from one or more users (such as, for example, an administrator associated with PCRF 240), and may output policy information to one or more devices that enforce the policies, such as PGW 230.

ILQ engine 245 may include one or more server devices, or other types of devices, that store, receive, and/or output information that correlates QoS levels regarding various layers of the OSI model. The information stored by ILQ engine 245 may facilitate the application of various QoS techniques by user device 205, router 210, PGW 230, and/or other devices. In some implementations, ILQ engine 245 may include an API, via which an administrator, third party application developers, and/or other users may provide information that correlates network layer QoS levels to link layer QoS levels, and/or link layer QoS levels to MPLS classes of service. ILQ engine 245 may, in some implementations, provide some or all of the stored and/or received information to PCRF 240.

Network 250 may include one or more wired and/or wireless networks. For example, network 250 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 250 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, network 250 may include a private enterprise network, and/or a private portion of a provider's back-end network.

Network 250 may include one or more edge routers 255, which may include one or more network devices act as ingress and egress points for traffic into and out of network 250. In some implementations, edge router 255 may include a label edge router, which operates using MPLS, IP, and/or other protocols. For example, edge router 255 may receive MPLS packets from outside of network 250, extract IP packets from the MPLS packets, and may forward the extracted IP packets within network 250. Further, edge router 255 may receive IP packets from within network 250, encapsulate the IP packets in MPLS packets, and forward the MPLS packets to a destination outside of network 250.

Application server 260 may include one or more communication and computation devices, such as one or more server devices. Application server 260 may, in some implementations, be implemented as a "cloud" system, in which multiple distributed physical devices may be virtualized as a single device, and/or in which resources of one device may be virtualized as multiple devices. In some implementations, application server 260 may be implemented within a private or enterprise network, which may be connected to network 250 via one or more edge routers that are implemented within the private or enterprise network. Application server 260 may, in some implementations, be associated with a content provider that provides content (e.g., streaming content, such as streaming video, streaming audio, streaming game content, etc.) to one or more user devices 205.

In some implementations, application server 260 may include, or may be communicatively coupled with, one or more content delivery networks ("CDNs"), which may include multiple storage devices, located at geographically diverse locations, that cache copies of content for fast delivery to user devices 205. Application server 260 may, in some implementations, be owned and/or operated by an entity that has a relationship or agreement with an owner and/or an operator of the EPS, and/or may be owned and/or operated by the owner and/or operator of the EPS. For instance, application server 260 may be associated with an allocated amount of usage of the EPS (e.g., allocated amounts of throughput, latency, etc.), and/or application server 260 may be associated with a billing model, whereby the owner and/or operator of application server 260 is charged for specific usage of the EPS. Application server 260 may communicate with one or more components of the EPS or the IMS core, or with a device that is communicatively coupled to the EPS or the IMS core (e.g., HSS/SPR 235 and/or provisioning interface 265), in order to request the provisioning of bearers on behalf of one or more user devices 205.

As described below, application server 260 may request the provisioning of bearers on the behalf of particular user devices 205. The requested bearers may be associated with particular QoS levels, which may correspond to "better" levels of service than would ordinarily be provided to user devices 205. As an example, application server 260 may be associated with a streaming video content provider, and may offer "premium" subscriptions or content to certain users. User devices 205 that access the premium content (or are associated with a premium subscription) may receive the content via bearers that provide higher throughput and/or lower latency than other users.

Provisioning interface 265 may include one or more communication and computation devices that serve as an interface for receiving requests, to provision bearers according to particular QoS levels, from devices outside of the EPS. For example, provisioning interface 265 may implement an application programming interface ("API"), an IP interface and/or another type of interface, via which provisioning interface 265 may receive such requests from application server 260. Provisioning interface 265 may also serve as a decision point, at which requests may be granted or denied. For example, provisioning interface 265 may grant or deny provisioning requests based on subscriptions and/or billing information associated with requesting application servers 260, and/or may receive manual input (e.g., from an owner, administrator, and/or operator of the EPS) regarding whether to grant or deny provisioning requests. In some implementations, provisioning interface 265 may communicate with HSS/SPR 235 (e.g., via an API and/or another type of interface), in order to notify HSS/SPR 235 regarding bearers, associated with user devices 205 and/or application servers 260, that should be provisioned.

FIGS. 3A and 3B illustrate example data structures 300 and 350 that may be stored by ILQ engine 245. Data structures 300 and 350 may serve as, or be incorporated in, traffic flow templates ("TFTs"), which may be used by user device 205 and/or router 210 when performing inter-layer QoS enforcement. Data structures 300 and 350 may include information that correlates QoS levels of one layer of the OSI model to QoS levels of another layer of the OSI model. The information stored in data structures 300 and 350 may be received (e.g., by ILQ engine 245) from, for example, an administrator associated with network 250, a subscriber associated with user device 205 and/or router 210, or from another source. In some implementations, the information stored in data structures 300 and 350 may be received via an API, which allows a user (e.g., a subscriber associated with user device 205 and/or router 210) to provide information that correlates QoS levels of one layer of the OSI model to QoS levels of another layer of the OSI model. As mentioned above, ILQ engine 245 may provide some or all of the information stored in data structures 300 and/or 350 to PCRF 240.

In some implementations, data structures 300 and/or 350 may be maintained on a per-subscriber (or per-set of subscribers) basis. For example, one user device 205 or router 210 (or set of user devices 205 or routers 210) may be associated with one instance of data structure 300, while another user device 205 or router 210 may be associated with another instance of data structure 300. In some implementations, data structures 300 and/or 350 may be maintained on a "system-wide" basis, where the information stored therein may be indiscriminately applicable to any user device 205 or router 210.

As shown in FIG. 3A, data structure 300 may store information that correlates network layer QoS levels (e.g., the "DSCP value(s)" column) to link layer QoS levels (e.g., the "QCI(s)" column). The "DSCP value(s)" column may include DSCP values, which denote a level of QoS, at the network layer, associated with traffic marked with particular DSCP values. For example, the values stored in these fields may correspond to values according to one or more standards or Requests for Comment ("RFCs") that describe possible DSCP values (e.g., RFCs 2474, 2475, 3246, 3260, and 4594). As shown, a field in this column may include the value "0," which may be a "catch-all" value—in that DSCP values, in traffic, which do not correspond to the values in the other fields, may be considered to correspond to the "catch-all" value.

As further shown, the "QCI(s)" field may include one or more QCIs, which denote a level of QoS, at the link layer, associated with traffic sent or received via a bearer associated with a particular QCI. In some implementations, a particular DSCP value (or set of DSCP values) may be associated with multiple QCIs. For instance, as shown in FIG. 3A, the DSCP value "EF" is associated with QCIs "1*" and "7." The asterisk in this QCIs field may conceptually denote that traffic marked with the "EF" DSCP value, from a particular subscriber, is associated with QCI 1, if a QCI 1 bearer is available for the subscriber. For example, a QCI 1 bearer may be available for the subscriber if the subscriber has subscribed to a service whereby a QCI 1 bearer is available for the subscriber, if network resources allow for a QCI 1 bearer to be available, etc. If a QCI 1 bearer is not available for the subscriber, then the information in this field denotes that traffic marked with the "EF" DSCP value should be associated with a QCI 7 bearer.

While an example was presented above, in which two QCIs are present in the same field, in some implementations, more than two QCIs may be present in a particular field. In some such implementations, the association of a QCI with a DSCP value may be made in a hierarchical or rule-based fashion.

As further shown, data structure 300 may also include a description field. The description field may include, for example, human-readable descriptions of types of traffic associated with DSCP values and/or QCIs.

FIG. 3B illustrates another example data structure 350, which may also store information that correlates network layer QoS levels (e.g., the "DSCP class selector(s)" column) to link layer QoS levels (e.g., the "QCI(s)" column). The information stored in 350 may be similar to the information stored in data structure 300, except that the network layer QoS levels may be presented as DSCP class selectors (e.g., as presented in RFC 4594), instead of DSCP values in the formatting provided above with respect to data structure 300.

As described further below, the information stored in data structures 300 and 350 may be stored and/or utilized by user device 205 and/or router 210. For example, when outputting traffic, user device 205 and/or router 210 may identify a DSCP value associated with the traffic and, based on the information stored in data structure 300, output the traffic via an appropriate bearer (e.g., a bearer having a QCI that matches the information indicated in data structure 300).

FIG. 4 illustrates an example data structure 400 that may store information correlating link layer QoS levels (e.g., QCIs) to MPLS traffic classes. In some implementations, the information in the "MPLS traffic class" field may be referred to as a class of service ("CoS"), experimental ("EXP") bits (e.g., as described in RFCs 5462 and 3032), traffic class, 802.1p bits (e.g., as standardized by the Institute of Electrical and Electronics Engineers ("IEEE") in the documents "IEEE Standard for Local and Metropolitan Area Networks; Virtual Bridged Local Area Networks," IEEE Std 802.1QTM-2005, May 19, 2006 and "Media Access Control (MAC) Bridges and Virtual Bridge Local Area Networks," IEEE Std 802.1QTM-2011, Aug. 31, 2011), and/or by another name.

As described further below, the information stored in data structure 400 may be stored and/or utilized by PGW 230. For example, PGW 230 may identify a QCI associated with received traffic (e.g., a QCI associated with a bearer via which traffic was received). Based on the information in data structure 400, PGW 230 may identify an MPLS traffic class (e.g., class of service, EXP bits, traffic class, 802.1p bits, etc.) associated with the traffic, and may encapsulate the traffic in one or more MPLS packets. The MPLS packets may include header information that specifies the corresponding MPLS traffic class, and PGW 230 may forward the MPLS packets (e.g., to network 250).

Figure 5B:
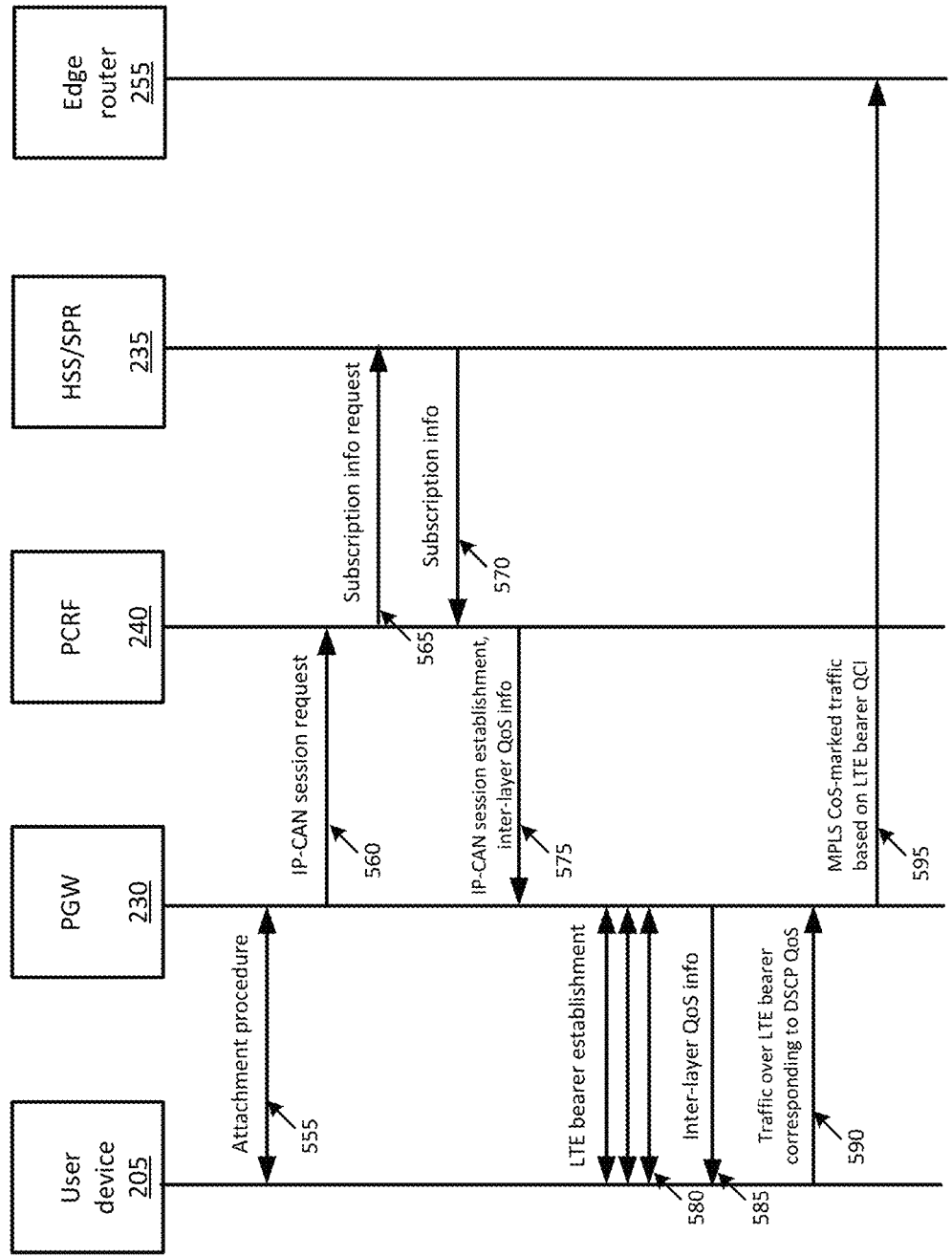
Figure 6A:
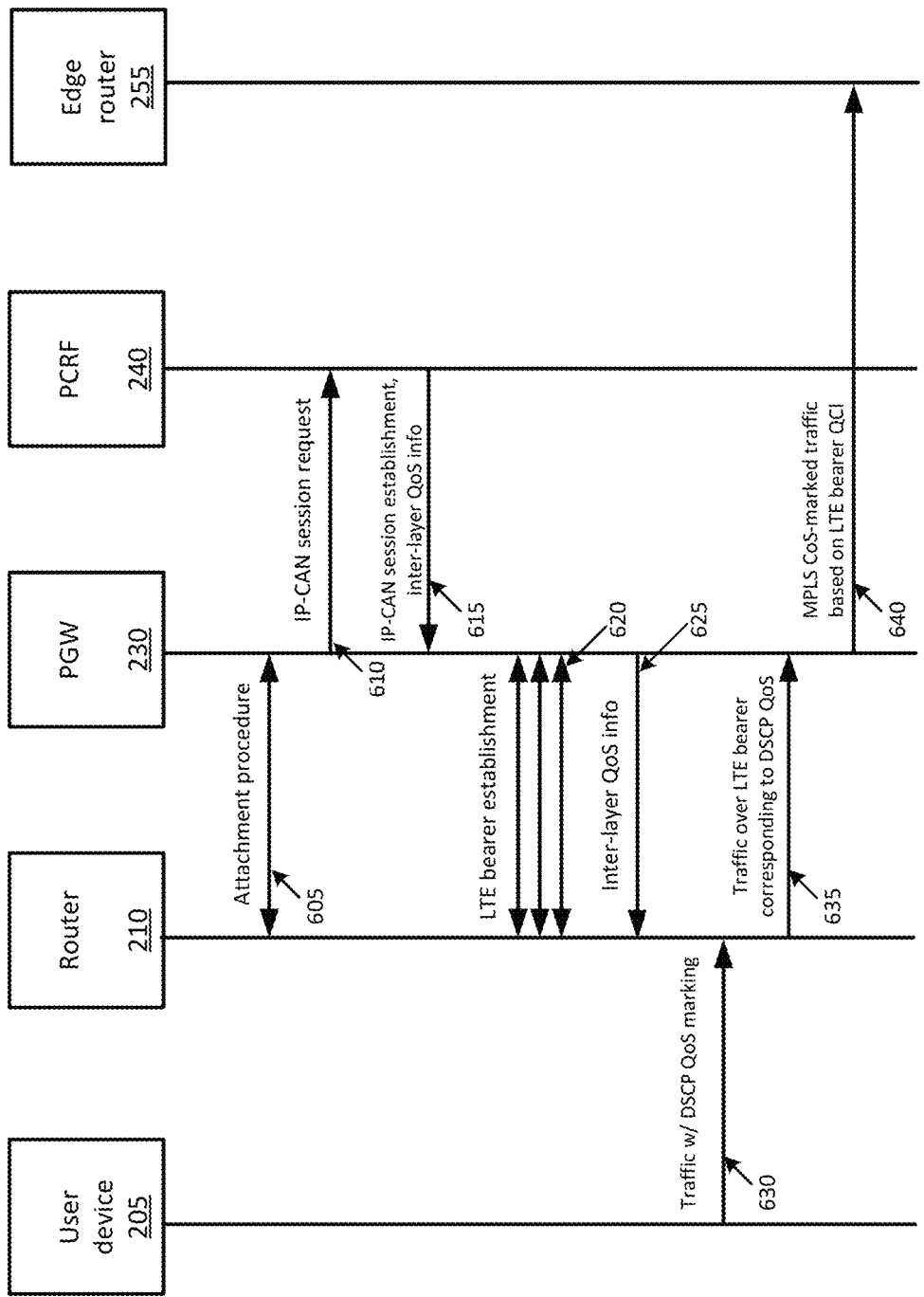
Figure 6B:
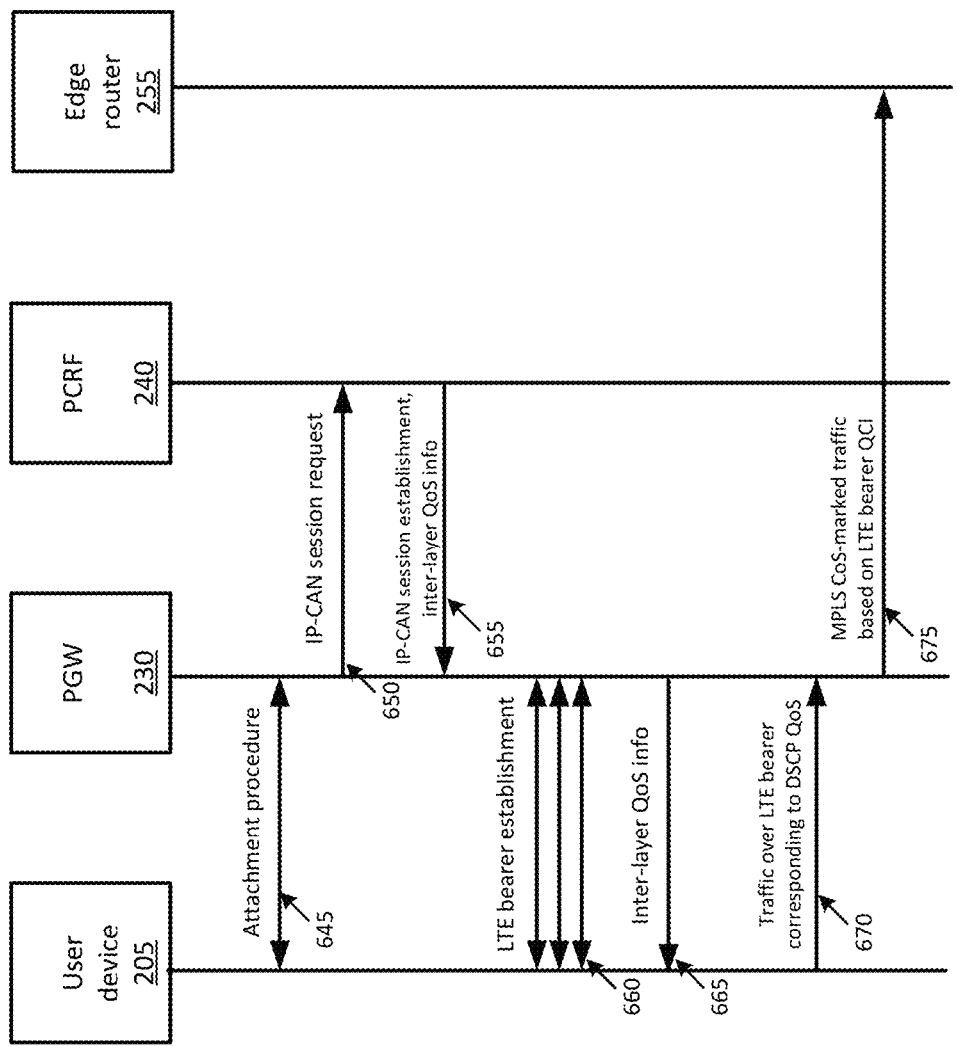

FIGS. 5A, 5B, 6A, and 6B illustrate examples of inter-layer QoS enforcement, according to some examples described herein. FIGS. 5A and 5B illustrate a subscription-based implementation, while FIGS. 6A and 6B illustrate an implementation that is not subscription-based. Further, FIGS. 5A and 6A illustrate an implementation in which router 210 and PGW 230 perform inter-layer QoS enforcement, while FIGS. 5B and 6B illustrate an implementation in which user device 205 and PGW 230 perform inter-layer QoS enforcement. Some of the signaling in these figures may be similar (e.g., signals 505, 555, 605, and 645); thus, the descriptions of some of these signals may be more briefly described with respect to one figure than another.

As shown in FIG. 5A, router 210 and PGW 230 may perform (at 505) an attachment procedure. The attachment procedure may include, for example, an attachment procedure according to an LTE standard. While not shown in the figure for the sake of conciseness, the attachment procedure may involve one or more other devices (e.g., base station 215, SGW 220, and MME 225). In this sense, the signal flow shown in this figure (and/or in other figures) may be considered to be a simplified representation of actual signal flows via which the attachment procedure may occur in practice. For example, the attachment procedure may include an attach request (not shown), sent by router 210 via base station 215. The attachment procedure may allow router 210 to be registered with PGW 230, to facilitate connectivity between PGW 230 and router 210.

PGW 230 may send (at 510) an IP-Connectivity Access Network ("IP-CAN") request to PCRF 240. This request may be sent via, for example, a Gx interface (e.g., as described in the documents, 3GPP TS [Technical Specification] 29.211 V6.4.0, "Technical Specification Group Core Network and Terminals; Rx Interface and Rx/Gx Signalling Flows (Release 6)," June 2007; and 3GPP TS 29.212 V12.1.0, "Technical Specification Group Core Network and Terminals; Policy and Charging Control (PCC); Reference Points (Release 12)," June 2013).

The IP-CAN request may be made so that an IP-CAN session, associated with router 210, may be subsequently established. The IP-CAN session, once established, may facilitate IP connectivity between router 210 and PGW 230. In some implementations, PCRF 240 may perform policy enforcement or other functionality in order to determine whether an IP-CAN session should be permitted to be established.

PCRF may request (at 515) subscription information associated with router 210. The request may be sent to, for example, HSS/SPR 235. As described above, HSS/SPR 235 may store subscriber information, which may indicate whether router 210 is subscribed to a service associated with inter-layer QoS enforcement. The subscriber information may also, in some implementations, indicate parameters for the service (e.g., which QoS levels of one layer are associated with which QoS levels of another layer).

HSS/SPR 235 may output (at 520) the requested subscription information to PCRF 240. Although not shown, if the requested subscription information is not present (e.g., if router 210 is not associated with a subscription to a service whereby inter-layer QoS is enforced), HSS/SPR 235 may output an indication to PCRF 240, indicating that router 210 is not associated with such a subscription.

At 525, an IP-CAN session, associated with router 210, may be established. Further, PCRF 240 may output (at 525) inter-layer QoS information associated with router 210. This information may indicate, for instance, that router 210 is associated with a subscription to a service associated with inter-layer QoS enforcement. This information may also include parameters for the service (e.g., which QoS levels of one layer are associated with which QoS levels of another layer).

At 530, multiple LTE bearers may be established between router 210 and PGW 230. Although not shown, other devices (e.g., base station 215, SGW 220, and MME 225) may be involved in the establishment of the bearers. The established bearers may each be associated with different QoS levels (e.g., QCIs). As described above, the different QoS levels of the bearers may be indicated by the inter-layer QoS information provided by PCRF 240.

PGW 230 may also output (at 535) some or all of the inter-layer QoS information to router 210. For example, PGW 230 may output this information to router 210 before, after, or during the LTE bearer establishment (at 530). This information may be used by router 210 to facilitate inter-layer QoS enforcement for traffic sent to and/or received by traffic 210.

While signals 505-535 correspond to an example of the initiation of inter-layer QoS enforcement functionality for router 210, signals 540-550 correspond to inter-layer QoS enforcement being performed. For instance, router 210 may receive (at 540) traffic from user device 205, which may have previously registered with and/or attached to router 210. The traffic may include a QoS marking at the network layer, such as a DSCP value in a header of the traffic.

In the example shown in FIG. 5A, the traffic outputted by user device includes the network layer QoS marking. In practice, router 210 may additionally, or alternatively, apply a network layer QoS marking to the traffic (e.g., may add or modify a DSCP value associated with the received traffic).

Router 210 may identify a bearer via which the traffic should be transmitted, based on the DSCP value associated with the received traffic. For example, router 210 may use the inter-layer QoS information (received at 535) to identify a QCI, based on the DSCP value of the traffic. Router 210 may identify one of the bearers, established at 530, associated with the QCI, and may output (at 545) the traffic via the identified bearer.

PGW 230 may receive the traffic (e.g., via one or more other devices, such as base station 215 and SGW 220, not shown), and may identify an MPLS CoS, which should be applied to the traffic. For example, the subscription information (received at 520) may indicate a correlation between one or more CoSs and one or more QCIs. Using this information, PGW 230 may determine, based on the QCI of the bearer via which the traffic was received, which MPLS CoS should be applied to the traffic for subsequent forwarding. For example, PGW 230 may encapsulate the traffic in one or more MPLS packets, and may set header information (e.g., a CoS field, an EXP bit, a p-bit, etc.) of the MPLS packets to indicate the desired CoS.

PGW may output (at 550) the one or more MPLS packets to, for example, network 250. As described above, network 250 may include a set of edge routers 255, one of which may receive the one or more MPLS packets and may extract the original traffic (e.g., the traffic outputted by user device 205 at 540 and/or the traffic outputted by router 210 at 545). In this manner, the original network layer QoS, specified by user device 205 and/or 210, may be preserved within network 250 (and/or during subsequent communications to other destinations).

Although not shown, similar techniques may be used for traffic sent to user device 205, from network 250. For example, network 250 may output (e.g., via edge router 255) traffic, having a particular DSCP value and encapsulated in one or more MPLS packets according to a particular CoS to user device 205. PGW 230 may receive the one or more MPLS packets, and may identify a QCI associated with the particular CoS and/or the particular DSCP value. PGW 230 may extract the traffic from the MPLS packets (e.g., may remove some or all MPLS header information), and may forward the traffic to user device 205 via an established bearer that is associated with the identified QCI.

FIG. 5B illustrates another example signal flow for inter-layer QoS enforcement. As shown, user device 205 and PGW 230 may perform (at 555) an attachment procedure, PGW 230 may request (at 560) an IP-CAN session, and PCRF 240 may request and receive (at 565 and 570, respectively) subscription information associated with user device 205. An IP-CAN session, associated with user device 205, may be established (at 575). Further, PGW 230 may receive (at 575) inter-layer QoS information. As described above, the inter-layer QoS information may include information that aids PGW 230 and/or user device 205 in performing inter-layer QoS enforcement. Multiple LTE bearers may be established (at 580) between PGW 230 and user device 205. These LTE bearers may correspond to different QCIs, which may be indicated in the inter-layer QoS information received at 570. PGW 230 may further output (at 585) some or all of the inter-layer QoS information to user device 205.

User device 205 may identify traffic to be outputted to, for example, network 250. User device 205 may identify an application and/or a network layer QoS level (e.g., a DSCP value) associated with the traffic to be outputted. Based on the application and/or the network layer QoS level, user device 205 may determine via which bearer, of the bearers established at 575, the traffic should be outputted. User device 205 may output (at 590) the traffic via the selected bearer. Based on via which bearer the traffic was received, PGW 230 may determine an MPLS CoS associated with the traffic, and may encapsulate the traffic in one or more MPLS packets that are associated with the appropriate MPLS CoS. PGW 230 may forward (at 595) the MPLS packets to network 250 (e.g., to edge router 255). When traffic is sent from network 250 to user device 205, similar techniques may be used to ensure inter-layer enforcement.

FIG. 6A illustrates an example of inter-layer QoS enforcement, involving router 210. As mentioned above, the example shown in FIG. 6A may correspond to an implementation in which a subscription to an inter-layer QoS service is not necessary. As shown, router 210 and PGW 230 may perform (at 605) an attachment procedure, PGW 230 may request (at 610) an IP-CAN session, and an IP-CAN session, associated with router 210, may be established (at 615). Further, PGW 230 may receive (at 615) inter-layer QoS information from PCRF 240. PCRF 240 may receive the information from, for example, ILQ engine 245 (e.g., prior to receiving the IP-CAN session request at 610, or in some instances, based on receiving the IP-CAN session request at 610). As described above, the inter-layer QoS information may include information that aids PGW 230 and/or router 210 in performing inter-layer QoS enforcement. Multiple LTE bearers may be established (at 620) between PGW 230 and user device 205. These LTE bearers may correspond to different QCIs, which may be indicated in the inter-layer QoS information received at 615. PGW 230 may further output (at 625) some or all of the inter-layer QoS information to user device 205.

User device 205 may output (at 630) traffic to router 210. The traffic may include a DSCP value. Additionally, or alternatively, router 210 may add or modify a DSCP value associated with the traffic. Based on the DSCP value, router 210 may determine via which bearer, of the bearers established at 620, the traffic should be outputted. Router 210 may output (at 635) the traffic via the selected bearer. Based on via which bearer the traffic was received, PGW 230 may determine an MPLS CoS associated with the traffic, and may encapsulate the traffic in one or more MPLS packets that are associated with the appropriate MPLS CoS. PGW 230 may forward (at 640) the MPLS packets to network 250 (e.g., to edge router 255). When traffic is sent from network 250 to router 210, similar techniques may be used to ensure inter-layer enforcement.

FIG. 6B illustrates an example of inter-layer QoS enforcement, in which user device 205 performs functions relating to inter-layer QoS enforcement. As mentioned above, the example shown in FIG. 6B may correspond to an implementation in which a subscription to an inter-layer QoS service is not necessary. As shown, user device 205 and PGW 230 may perform (at 645) an attachment procedure, PGW 230 may request (at 650) an IP-CAN session, and an IP-CAN session, associated with user device 205, may be established (at 655). Further, PGW 230 may receive (at 655) inter-layer QoS information. As described above, the inter-layer QoS information may include information that aids PGW 230 and/or user device 205 in performing inter-layer QoS enforcement. Multiple LTE bearers may be established (at 660) between PGW 230 and user device 205. These LTE bearers may correspond to different QCIs, which may be indicated in the inter-layer QoS information received at 615. PGW 230 may further output (at 665) some or all of the inter-layer QoS information to user device 205.

User device 205 may identify traffic to be outputted to, for example, network 250. User device 205 may identify an application and/or a network layer QoS level (e.g., a DSCP value) associated with the traffic to be outputted. Based on the application and/or the network layer QoS level, user device 205 may determine via which bearer, of the bearers established at 660, the traffic should be outputted. User device 205 may output (at 670) the traffic via the selected bearer. Based on via which bearer the traffic was received, PGW 230 may determine an MPLS CoS associated with the traffic, and may encapsulate the traffic in one or more MPLS packets that are associated with the appropriate MPLS CoS. PGW 230 may forward (at 675) the MPLS packets to network 250 (e.g., to edge router 255). When traffic is sent from network 250 to user device 205, similar techniques may be used to ensure inter-layer enforcement.

Figure 7A:
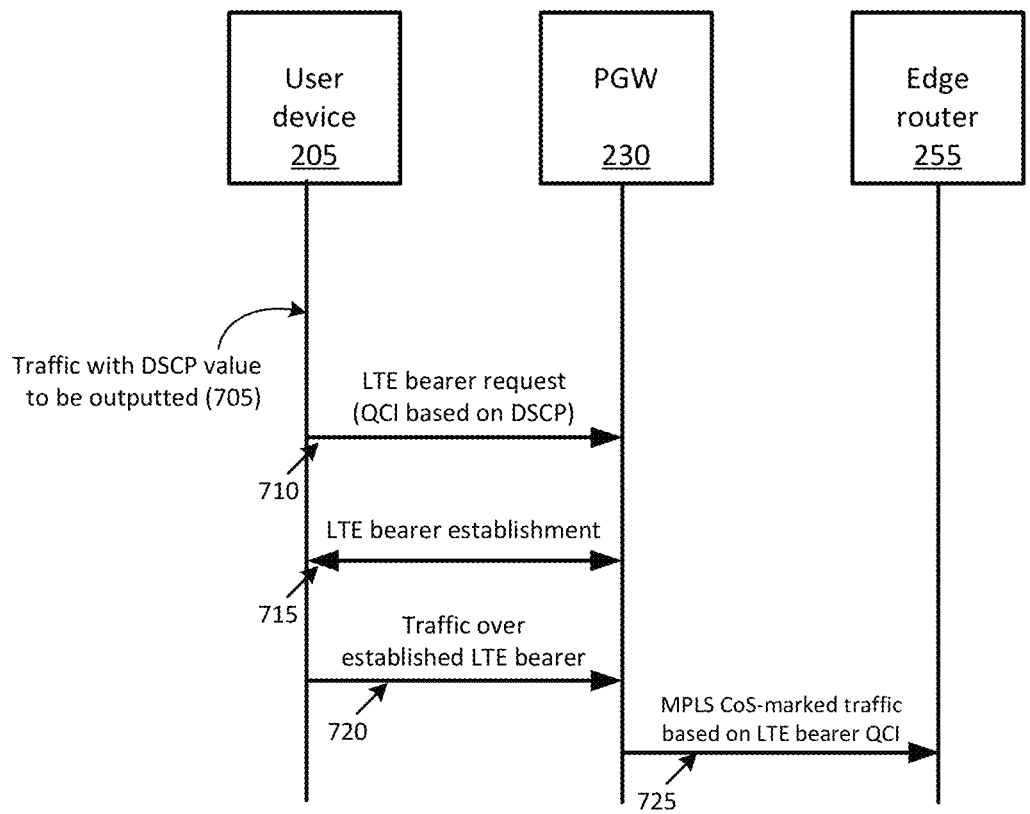

FIG. 7A illustrates an example of inter-layer QoS enforcement, in which bearers may be established on an "on demand" or an "as needed" basis. Although not shown for the sake of conciseness, some of the signaling shown in FIG. 7A may occur as part of an attachment procedure between user device 205 and PGW 230. For example, some similar signaling to the signaling shown above with respect to FIGS. 5A, 5B, 6A, and 6B (e.g., signals 645-655 and 665) may occur prior to, or concurrently with, some of the signals shown in FIG. 7A. Further, while FIG. 7A is described in the context of user device 205, another device (e.g., router 210) may perform some or all of the functions described below with respect to user device 205.

As shown, user device 205 may identify (at 705) traffic to be outputted (e.g., to network 250). User device 205 may determine a network layer QoS level associated with the traffic (e.g., based on a DSCP value in a header of the traffic, based on a type of the traffic, based on an application associated with the traffic, etc.). User device 205 may identify a link layer QoS level (e.g., a QCI) associated with the network layer QoS level. For example, user device 205 may store inter-layer QoS information that correlates DSCP values to QCIs. User device 205 may have received the inter-layer QoS information as part of an attachment procedure with PGW 230, or at another time (e.g., during a configuration or update process performed by a network service provider associated with PGW 230).

User device 205 may request (at 710) that a bearer, associated with the identified QCI, be established between user device 205 and PGW 230. In some implementations, PGW 230 may perform policy or rule enforcement to determine whether the bearer should be established (e.g., whether network resources are available, whether user device 205 is subscribed to or otherwise approved for the requested QCI, etc.). Assuming that PGW 230 determines that the bearer is permissible to be established, the bearer may be established (at 715) between user device 205 and PGW 230. Although not shown in the figure, if PGW 230 does not determine that the bearer with the requested QCI should be established, PGW 230 may notify user device 205 that the request was rejected, and/or may indicate, to user device 205, an alternate QCI that would be permissible. User device 205 may output (at 720) the traffic over the established LTE bearer, and PGW 230 may apply MPLS-level QoS treatment to the traffic when forwarding (at 725) the traffic to edge router 255. In some situations, a bearer with the appropriate QCI may have already been previously established. In these situations, user device 205 may forgo requesting that a new bearer be established, and may output (at 720) the traffic via the existing bearer.

Figure 7B:
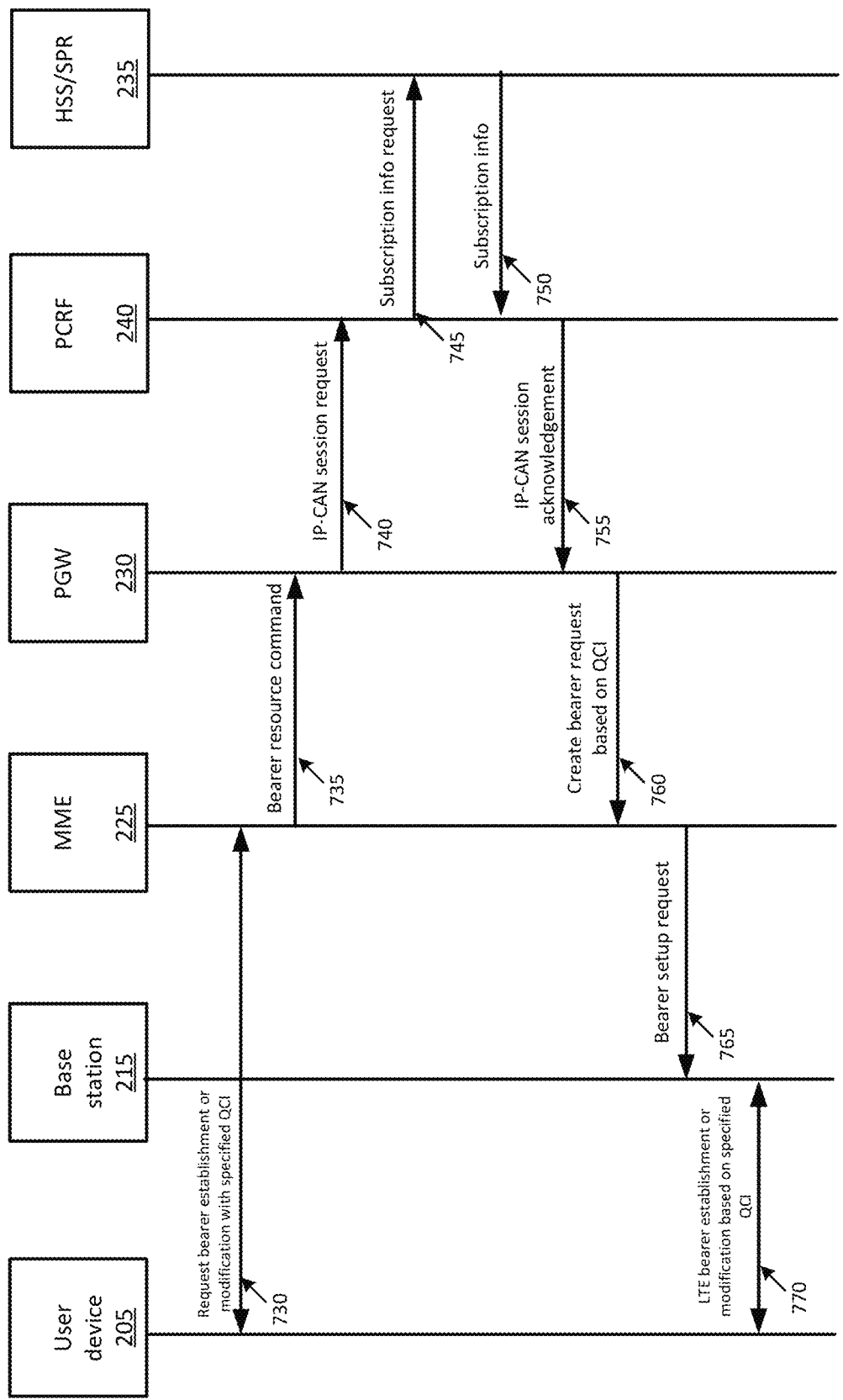

FIG. 7B illustrates an example of inter-layer QoS enforcement, in which user device 205 may specifically request the establishment of a bearer of a particular QCI. For example, user device 205 may request (at 730) the establishment of a bearer, and/or the modification of an existing set of bearers. User device 205 may make this request based on, for instance, inter-layer QoS information stored and/or received by user device 205. For example, user device 205 may identify that traffic, associated with a particular DSCP value, is to be outputted by an application associated with user device 205. User device 205 may compare the DSCP value to inter-layer QoS information, stored by user device 205, in order to determine a QCI level associated with the DSCP value. In a situation where user device 205 determines that a bearer, associated with the determined QCI level, has not been established, user device 205 may make the request (at 730) to establish the bearer, and may specify the determined QCI level in the request. In some implementations, the request may include inter-layer QoS information that maps the requested QCI to a set of DSCP values.

The request (made at 730) may be received by MME 225 (e.g., via base station 215). Based on receiving the request, MME 225 may send (at 735) a bearer resource command to PGW 230. The bearer resource command may identify, among other information, the QCI level indicated in the request (sent at 725) from user device 205.

The bearer resource command (sent at 735) may be received by PCRF 240 (e.g., via SGW 220). Based on the bearer resource command, PCRF 240 may request (at 740) the establishment of an IP-CAN session, or the modification of an existing IP-CAN session. In some implementations, based on the IP-CAN session request, PCRF 240 may verify whether user device 205 is authorized for the requested QCI level. For instance, PCRF 240 may request (at 745) subscription information from HSS/SPR 235. HSS/SPR 235 may, in some implementations, store subscription information, which may indicate whether user device 205 is authorized for the requested QCI level.

HSS/SPR 235 may output (at 750) the requested subscription information to PCRF 240. Although not shown, if the requested subscription information is not present (e.g., if user device 205 is not authorized for the QCI level, and/or is not associated with a subscription that allows user device 205 to request specific QCI levels), HSS/SPR 235 may output an indication to PCRF 240, indicating that user 205 is not associated with such a subscription, and/or is not authorized for the requested QCI level.

At 755, PCRF 240 may output an IP-CAN session acknowledgement, and an IP-CAN session may be established (or an existing IP-CAN session may be modified, based on the QCI level). PGW may output (at 760) a request to create a bearer that is associated with the requested QCI level. MME 225 may receive the request (e.g., via SGW 220), and may output (at 765) a bearer setup request to base station 215. The bearer setup request may indicate the QCI level specified in the request sent at 730). In some implementations, the bearer setup request (sent at 765) may be a request to establish an Evolved Universal Terrestrial Radio Access Network Radio Access Bearer ("E-RAB"), and may indicate the requested QCI level.

Based on the bearer setup request (sent at 765), base station 215 may establish an LTE bearer (e.g., by establishing a Radio Resource Control ("RRC") channel), associated with the specified QCI level, with user device 205. In some implementations, base station 215 may modify an existing set of RRC channels when establishing the LTE bearer associated with the specified QCI level.

Once the bearer has been established (at 770), user device 205 may proceed to output traffic via the bearer. For example, user device 205 may store inter-layer QoS information that correlates DSCP values to QCI levels. Assume that the bearer established at 770 is associated with a QCI level of 1, and that inter-layer QoS information, stored by user device 205, indicates that a DSCP value of "EF" is correlated to QCI level 1. Further assume that user device 205 identifies that traffic, having a DSCP value of "EF," is to be outputted by user device 205. Based on the stored inter-layer QoS information, user device 205 may output this traffic over the established bearer that is associated with QCI level 1.

Figure 8:
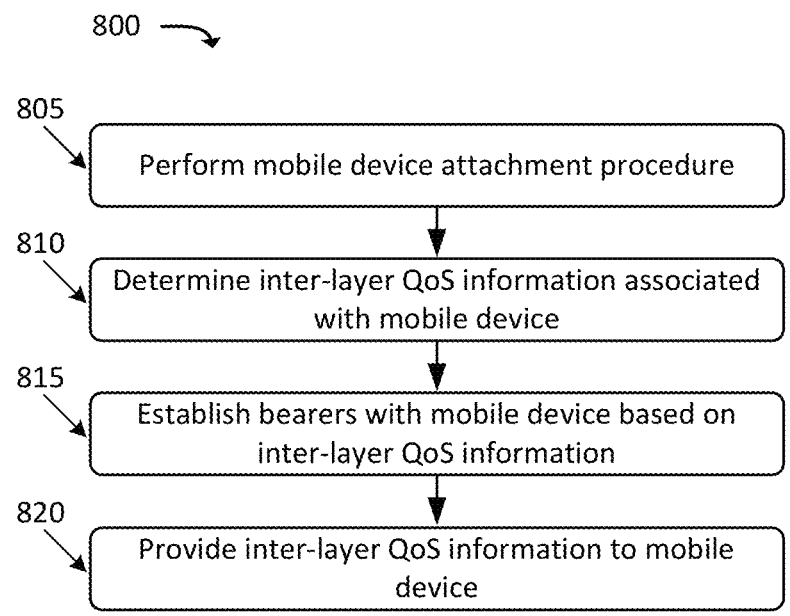
FIGS. 8-10 illustrate example processes for performing inter-layer QoS enforcement, in accordance with some implementations.
Figure 9:
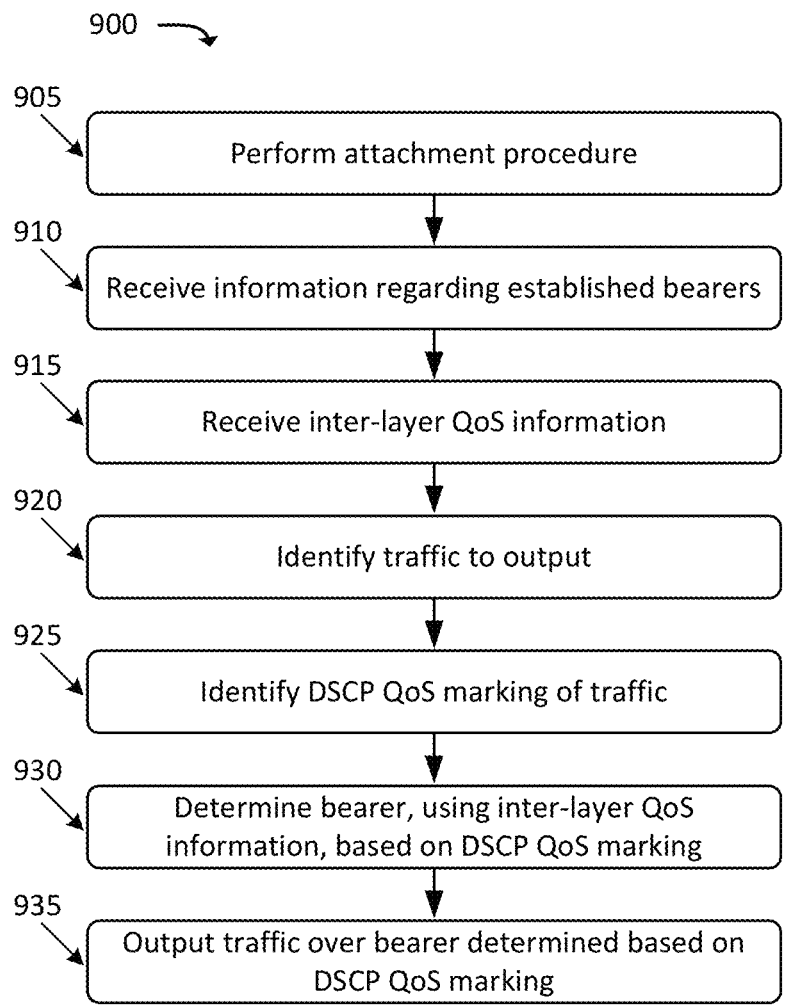
Figure 10:
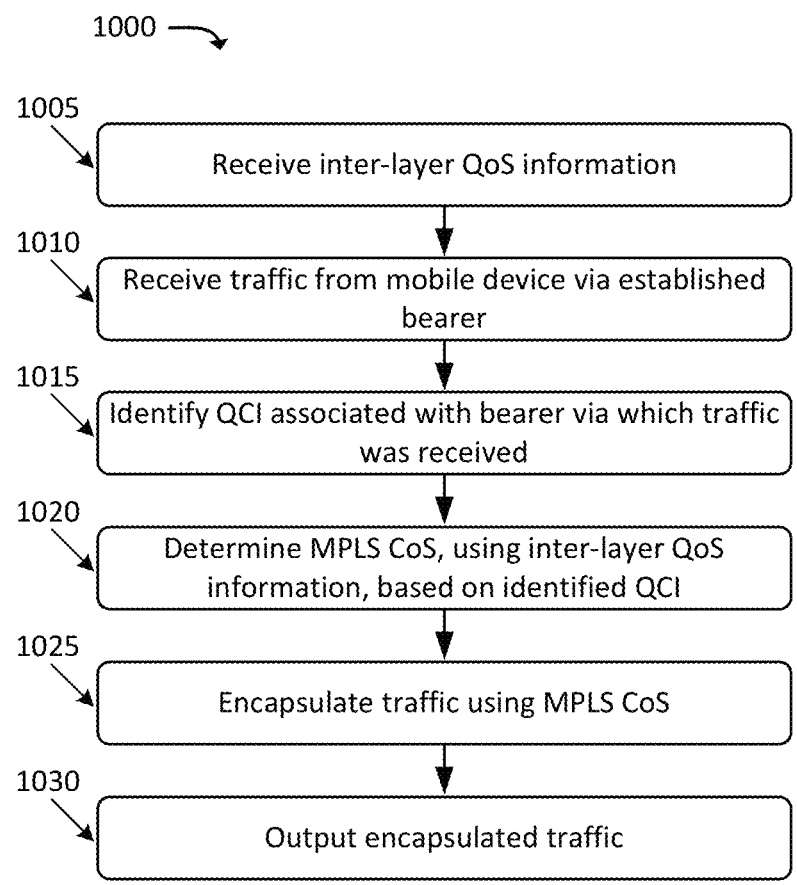

FIGS. 8-10 illustrate example processes for performing inter-layer QoS enforcement. In one example implementation, processes 800 and 1000 may be performed by PGW 230, and process 900 may be performed by user device 205 and/or router 210. In some implementations, some or all of processes 800, 900, and 1000 may be performed by one or more other devices in lieu of, or in conjunction with, the devices mentioned above. As used in the context of FIGS. 8 and 10, the term "mobile device" may refer to user device 205, router 210, and/or another suitable device.

Process 800 may include performing a mobile device attachment procedure (block 805). For example, as described above, PGW 230 may perform an attachment procedure with user device 205 and/or router 210.

Process 800 may also include determining inter-layer QoS information associated with the mobile device (block 810). For example, PGW 230 may determine an instance of data structure 300 and/or 350 associated with the mobile device, in order to determine a set of QCIs of bearers that should be established for the mobile device. As described above, the inter-layer QoS information may be received from PCRF 240 and/or from ILQ engine 245.

Process 800 may further include establishing bearers with the mobile device based on the inter-layer QoS information (block 815). For example, referring to the example information shown in FIG. 3A, PGW 230 may establish three bearers with the mobile device, where the bearers each correspond to a different one of QCI 1, QCI 7, and QCI 8.

Process 800 may also include providing some or all of the inter-layer QoS information to the mobile device (block 820). For instance, PGW 230 may output some or all of the contents of data structure 300 or 350 to the mobile device. This inter-layer QoS information may aid the mobile device in performing inter-layer QoS enforcement (e.g., may indicate which QCIs, of the established bearers, are associated with which DSCP values).

With respect to FIG. 9, process 900 is described below in the context of being performed by user device 205. However, as mentioned above, process 900 may be performed by router 210 and/or another device.

Process 900 may include performing an attachment procedure (block 905). For example, user device 205 may send an attach request to PGW 230, and perform other signaling associated with attachment.

Process 900 may also include receiving information regarding established bearers (block 910). For instance, as described above, a set of bearers, corresponding to different link layer QoS levels, may be established between user device 205 and PGW 230, based on the attachment procedure performed at block 905. User device 205 may receive information regarding the bearers (e.g., bearer identifiers) from PGW 230.

Process 900 may further include receiving inter-layer QoS information (block 915). For example, user device 205 may receive information that correlates network layer QoS levels (e.g., DSCP values) to link layer QoS levels (e.g., QCIs). User device 205 may receive the inter-layer QoS information from PGW 230 and/or from another source. The inter-layer QoS information may be received in conjunction with, before, or after the attachment procedure (at 905).

Process 900 may additionally include identifying traffic to output (block 920). For instance, an application (e.g., a voice call application, a video call application, a file transfer application, a gaming application, etc.) associated with user device 205 may indicate that traffic should be outputted to network 250.

Process 900 may also include identifying a DSCP QoS marking of the traffic (block 925). For instance, the application, from which the traffic is outputted, may include a DSCP value in a header of the traffic. Additionally, or alternatively, user device 205 may add or modify a DSCP value in a header of the traffic (e.g., based on the traffic type, an identity of the application, the application type, and/or another factor). In some implementations, the traffic may include encryption or encapsulation techniques, such as Generic Routing Encapsulation ("GRE") or IP Security ("IPSec"). These techniques may "hide" some or all of the content of the traffic, but may retain the DSCP QoS markings of the traffic. Thus, techniques described herein may be applicable even to encrypted or encapsulated traffic.

Process 900 may further include determining which bearer, of the established bearers, the traffic should be outputted, based on the inter-layer QoS information and the DSCP QoS marking (block 930). For example, user device 205 may use the inter-layer QoS information (received at block 915) to determine a QCI associated with the DSCP value of the traffic, and may identify a bearer, of the established bearers, that is associated with the identified QCI. Process 900 may additionally include outputting the traffic over the bearer that was determined based on the DSCP QoS marking (block 935).

Referring to FIG. 10, process 1000 may include receiving inter-layer QoS information (block 1005). For example, PGW 230 may receive inter-layer QoS information from PCRF 240 and/or ILQ engine 245. The inter-layer QoS information may correlate link layer QoS levels to MPLS traffic classes, and may, in some implementations, be in a format similar to data structure 400. PGW 230 may receive the inter-layer QoS information in conjunction with an attachment process between PGW 230 and a mobile device, and/or at another time (e.g., independent of any such attachment process).

Process 1010 may further include receiving traffic from a mobile device via an established bearer (block 1010). For example, PGW 230 may receive traffic from a mobile device via one of a group of bearers associated with the mobile device (e.g., as established at block 815 of FIG. 8), or via a bearer established upon a request by the mobile device (e.g., as requested at signal 710 of FIG. 7A).

Process 1000 may also include identifying a QCI associated with the bearer via which the traffic was received (block 1015), and determining, using the inter-layer QoS information, an MPLS traffic class (e.g., a CoS) associated with the QCI (block 1020). For example, PGW 230 may use the information in data structure 400 to determine an MPLS CoS associated with the QCI of the bearer via which the traffic was received.

Process 1000 may additionally include encapsulating the traffic, using the MPLS CoS (block 1025). For example, PGW 230 may encapsulate the traffic in one or more MPLS packets, and may mark a header of the packets with the MPLS CoS determined at block 1020.

Process 1000 may also include outputting the encapsulated traffic (block 1030). For instance, PGW 230 may forward the encapsulated traffic to network 250. At the MPLS layer, the encapsulated traffic may receive QoS treatment, at the MPLS layer, according to the marked CoS. As described above, an edge router 255, associated with network 250, may receive the encapsulated traffic and extract the original traffic (e.g., the traffic received at block 1010). The extracted traffic may subsequently receive QoS treatment, at the network layer, according to a network layer QoS marking (e.g., a DSCP value) associated with the traffic.

Figure 11A:
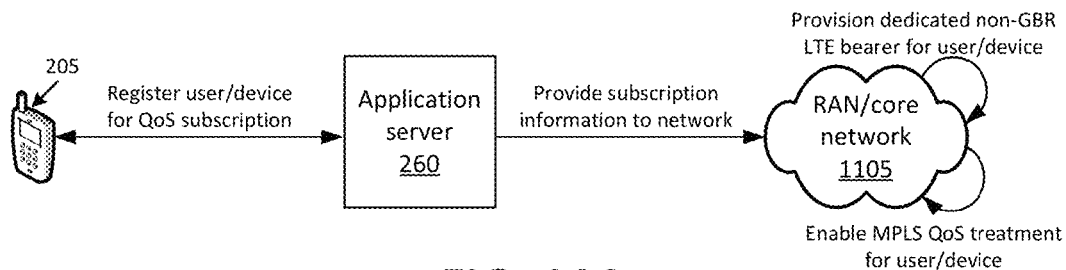
FIGS. 11A-C illustrate an example of one or more implementations described herein, in which a third party application server may request QoS treatment of traffic, associated with the application server, on behalf of a user device.
Figure 11B:
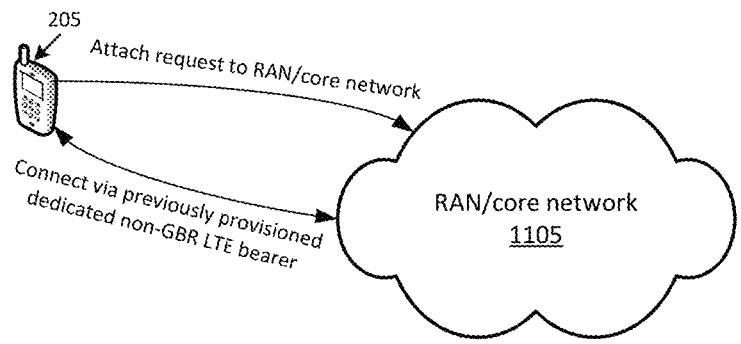
Figure 11C:
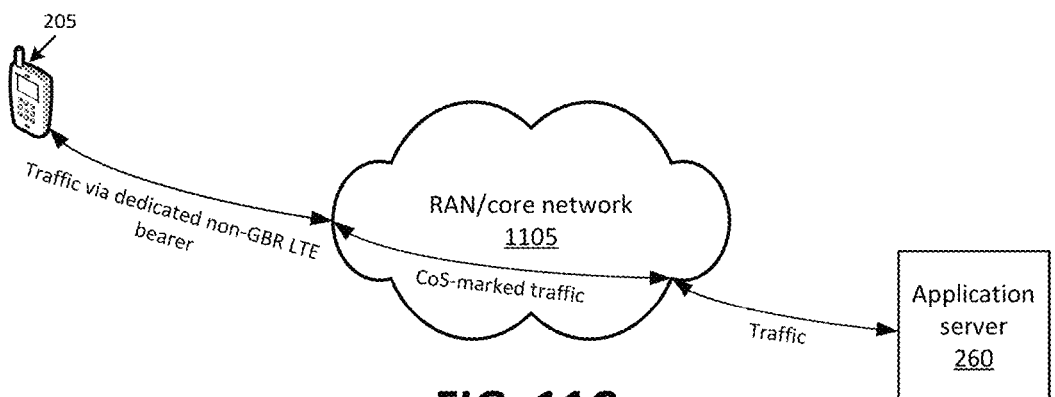

FIGS. 11A-11C illustrate an example implementation, in which an application server may request QoS treatment of traffic, associated with the application server, on behalf of a user device. For example, as mentioned above, an owner and/or operator of application server 260 may have an agreement and/or relationship with an owner and/or operator of RAN/core network 1105, whereby application server 260 may request the provisioning of bearers, associated with a particular QoS level, for traffic between application server 260 and particular user devices. For example, as shown, user device 205 may be registered as a device for which special QoS treatment should be applied for traffic between application server 260 and user device 205. The registration may be performed, for example, via a web interface, as part of the initial purchase process and/or provisioning of user device 205, etc. User device 205 may be associated with a user who has registered for a subscription to a service provided by application server 260 (e.g., a content streaming server). The service may specify, for example, "preferred" content delivery (e.g., delivery according to a higher QoS than would be provided without the subscription).

As further shown, application server 260 may output subscription information to RAN/core network 1105. The subscription information may include information identifying user device 205 and application server 260. In some implementations, the subscription information may specify one or more requested QoS levels (e.g., link layer QoS levels, such as QCI values). As described further below, one or more components of RAN/core network 1105 (e.g., a provisioning interface) may, based on the subscription information, provision one or more bearers, (e.g., a non-guaranteed bitrate ("non-GBR") LTE bearer) corresponding to the requested QoS levels (e.g., QCI values), for traffic sent between user device 205 and application server 260. RAN/core network 1105 may also enable MPLS QoS treatment, within RAN/core network 1105, of traffic sent between user device 205 and application server 260 (e.g., in a manner similar to that described above with respect to, for example, signals 520 and 525 of FIG. 5A).

FIG. 11B illustrates an example of associating user device 205 with a previously provisioned non-GBR LTE bearer (e.g., as provisioned based on a request from application server 260, as shown in FIG. 11A). User device 205 may request an attachment to RAN/core network 1105 (e.g., by sending an LTE ATTACH request), such as when user device 205 is powered on, when user device 205 enters a coverage area associated with RAN/core network 1105, etc. RAN/core network 1105 may identify, based on the attachment request, that user device 205 is associated with one or more previously established non-GBR LTE bearers, and may provide information to user device 205, regarding the previously established non-GBR LTE bearers. User device 205 may use the information to connect to RAN/core network 1105. In some implementations, while not shown in the figure, user device 205 may also connect to RAN/core network 1105 via a "default" bearer, and/or one or more other bearers.

FIG. 11C illustrates an example of how traffic, between user device 205 and application server 260, may be treated by RAN/core network 1105. For example, traffic, sent by user device 205 and destined for application server 260, may be sent via the dedicated non-GBR LTE bearer. Based on the QCI value associated with the LTE bearer, the traffic may traverse RAN/core network 1105 according to a CoS marking that is determined based on the QCI value (e.g., in a manner similar to that described above). Additionally, or alternatively, traffic, sent by application server 260 and destined for user device 205 may traverse RAN/core network 1105 according to a CoS marking that is determined based on subscription information associated with user device 205 and/or application server 260. Further, the traffic may be sent to user device 205 via the dedicated non-GBR LTE bearer.

By establishing dedicated bearers for traffic between particular user devices and application servers, some implementations may allow for customized QoS treatment to be offered by content providers. For example, third party content providers (e.g., entities that are external to a RAN/core network) may be able to offer particular levels of QoS treatment, thereby enhancing the service options provided by the content providers. Further, since some implementations provide a provisioning interface that is accessible to third party content providers, the concept of providing levels of service may be extended to third party content providers, instead of being exclusively handled by a RAN/core network. Additionally, since the established bearers are non-GBR bearers, according to some implementations, the bearers may easily be put into an idle state when not in use (e.g., without consuming excessive resources), and may be dynamically reactivated when needed to send and/or receive traffic to and/or from particular user devices.

FIG. 12 illustrates an example data structure 1200, which may indicate QoS levels (e.g., link layer QoS levels, such as QCI values) associated with user devices 205 and/or application servers 260. In some implementations, data structure 1200 may be stored by HSS/SPR 235. Information stored in data structure may be based on information received from one or more application servers 260 (e.g. via provisioning interface 265). For instance, application server 260 may provide subscription information to provisioning interface 265, indicating QoS levels associated with particular user device 205.

As shown, data structure 1200 may include the following example fields: User Device ID, Application Server ID, and QCI. The User Device ID field may include identifying information for a particular user device 205, such as an International Mobile Station Equipment Identity ("IMEI") value, an International Mobile Subscriber Identity ("IMSI") value, a media access control ("MAC") address, a proprietary (e.g., non-standard) identifier, and/or other identifying information. The Application Server ID field may include identifying information for a particular application server 260, such as an IP address, a MAC address, a proprietary (e.g., non-standard) identifier, and/or other identifying information. The QCI field may include a QCI value that indicates a link layer QoS level that should apply to bearers (e.g., LTE bearers) that carry traffic between user device 205 and application server 260.

Figure 13:
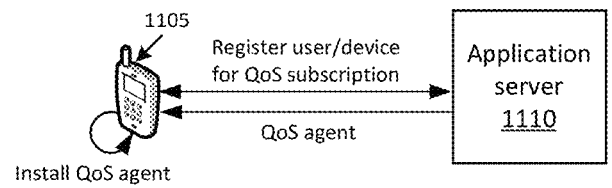
FIG. 13 conceptually illustrates the providing an installing of a QoS agent to a user device based on registering with an application server.

FIG. 13 conceptually illustrates an interaction between user device 205 and application server 260, when user device 205 subscribes to a particular QoS level for traffic sent and/or received to and/or from application server 260. A shown, user device 205 may be registered with application server 260. For instance, user device 205 may register through a web portal associated with application server 260, and/or information identifying user device 205 may be provided to application server 260 in some other way. Based on the registration, application server 260 may provide a QoS agent to user device 205, and user device 205 may install the QoS agent. As described below, the QoS agent may facilitate the sending and/or receiving of traffic to and/or from user device 205 via bearers that are associated with particular QoS levels (e.g., QoS levels indicated in the subscription).

Figure 14:
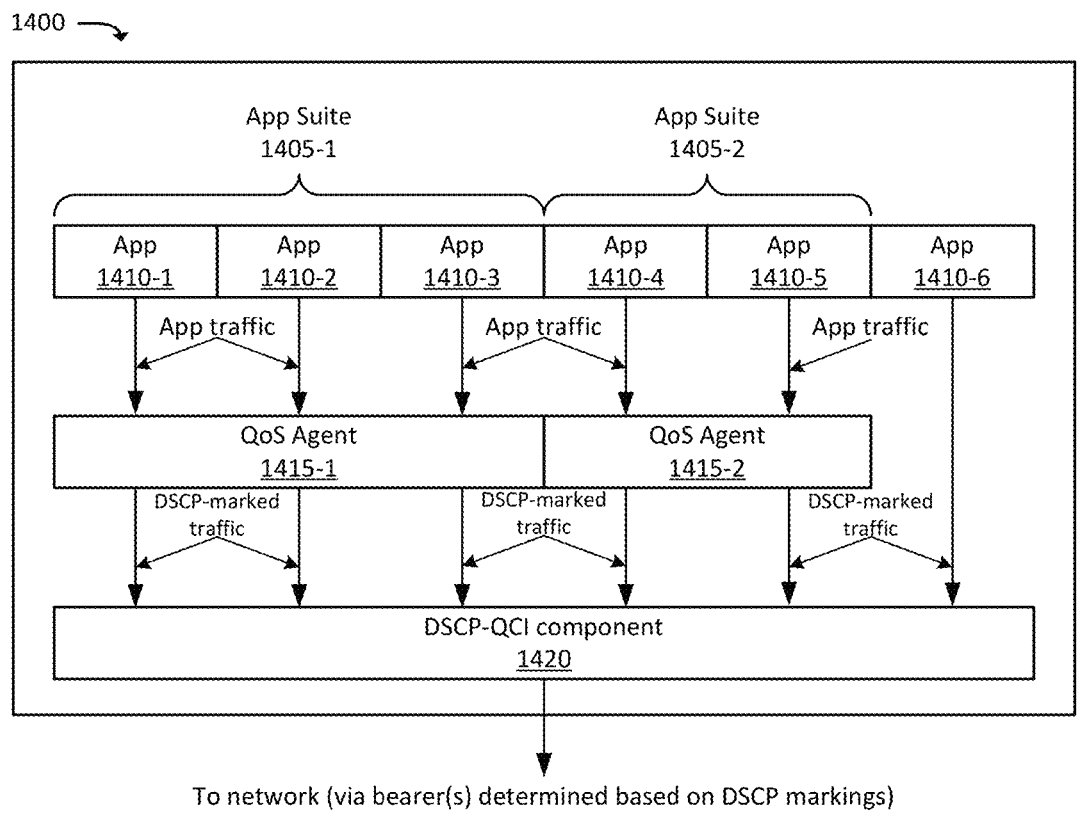
FIG. 14 illustrates an example data flow and example functional components of a user device, in accordance with some implementations.

FIG. 14 illustrates example functional components of device 1400, which may, in some implementations, correspond to a particular user device 205. As shown, device 1400 may include application ("app") suites 1405-1 and 1405-2 (sometimes herein referred to individually as "application suite 1405," or collectively as "application suites 1405"), applications 1410-1 through 1410-6 (sometimes herein referred to individually as "application 1410," or collectively as "applications 1410"), QoS agents 1415-1 and 1415-2 (sometimes herein referred to individually as "QoS agent 1415," or collectively as "QoS agents 1415"), and DSCP-QCI component 1420. In some implementations, device 1400 may include additional, fewer, different, and/or differently arranged components. Some or all of the functional components of device 1400 may be implemented via hardware circuitry, software logic, and/or a combination of hardware and software. For example, as described below, device 1400 may include one or more memory devices that store instructions, and one or more processing devices that execute the instructions to perform the functionality of one or more of the functional components of device 1400.

As shown, device 1400 may include a set of applications 1410, which may be applications that send and/or receive traffic to and/or from an external source (e.g., one or more networks, such as a RAN, a core network, and/or a PDN). For instance, a particular application 1410 may output traffic that is destined for one or more application servers 260, and may be indicated as the destination for traffic received from one or more application servers 260. For instance, a particular application 1410 may be a voice call application, a video conferencing application, a video streaming application, a gaming application, a web browsing application, an instant messaging application, and/or another type of application.

Some applications 1410 may be provided as part of an application suite 1405. A particular application suite 1405 may be provided by, for example, one entity (e.g., an owner and/or operator of a particular application server 260). When registering for a QoS subscription with the particular application server 260, QoS treatment may be applied to traffic sent and/or received by multiple applications 1410 in an application suite 1405 associated with the particular application server 260. Thus, in some such implementations, one QoS agent 1415 may be associated with one application suite 1405. In some implementations, one QoS agent 1415 may be associated with one particular application 1410. In other implementations, QoS agent 1415 may process traffic outputted by all applications 1410 installed on device 1400, in a manner described below. In some implementations, QoS agent 1415 may throttle the traffic, associated with one or more applications 1410, in order to ensure a particular QoS level of one or more other applications 1410.

A particular QoS agent 1415 may intercept traffic, outputted by one or more applications 1410, and may perform QoS policing operations on the traffic. For example, QoS agent 1415 may mark traffic with DSCP markings, in order to cause the traffic to be outputted via an LTE bearer according to a particular QCI. In some implementations, QoS agent 1415 may replace existing DSCP values with different DSCP values. QoS agent 1415 may store information that links particular applications and/or traffic types to particular DSCP values, and may use the information on intercepted traffic to mark the traffic with the DSCP values. This information may be useful in situations where a particular application 1410 does not mark outgoing traffic with DSCP values, and/or when a particular application (either mistakenly or maliciously) marks outgoing traffic with an incorrect DSCP value (e.g., in an attempt to obtain better QoS than is authorized).

Additionally, or alternatively, QoS agent 1415 may perform policing, queuing, buffering, and/or prioritization operations based on one or more other factors (e.g., one or more factors other than DSCP values). For example, QoS agent 1415 may prioritize traffic, to and/or from multiple applications 1410. For example, a first application 1410 may have a higher priority than a second application 1410. Assuming that both the first application 1410 and the second application 1410 output traffic at approximately the same time, QoS agent 1415 may forward the traffic, from the first application 1410, before the traffic from the second application 1410 (and/or may cause the traffic, associated with the first application 1410, to be processed before the traffic from the second application 1410). In some implementations, this policing, queuing, buffering, prioritization, etc., may be performed for applications 1410 within a particular application suite 1405, and/or may be performed on a per-application suite 1405 basis (e.g., one application suite 1405 may be associated with a higher priority than another application suite 1405).

FIG. 15 illustrates example data structures 1500-1520, some or all of which may be stored by QoS agent 1415. Data structure 1500 may link applications 1410 to DSCP values, data structure 1510 may link types of traffic to DSCP values, and data structure 1520 may link applications and types of traffic to DSCP values. Data structures 1500-1520 may be received from application server 260 and/or another source. For example, data structures 1500-1520 may be provided in conjunction with, and/or may be implemented (e.g., hard coded) by QoS agent 1415. QoS agent 1415 may inspect traffic, outputted by applications 1410, in order to identify whether the information stored in data structures 1500-1520 is applicable to the traffic. When the information is applicable to the traffic, QoS agent 1415 may mark the traffic with a particular DSCP value, as indicated in data structures 1500-1520.

Data structure 1500, for example, may include application identifiers, which may be an application name and/or another identifier. The application identifier may be used by QoS agent 1415 to determine whether a particular DSCP value should be applied to traffic. For example, assume that QoS agent 1415 inspects traffic outputted by an application called "Mall of Duty." QoS agent 1415 may identify that the traffic has been outputted by the particular application based on inspecting header and/or payload information in the traffic. For instance, the header and/or the payload may include an application ID, and/or other information which may be used to identify the application. QoS agent 1415 may determine that the information in the third row of data structure 1500 is applicable to the traffic (i.e., the row that includes the "Mall of Duty" application identifier). That is, QoS agent 1415 may determine that the traffic should be marked with the DSCP value "AF31," and may mark the traffic accordingly.

Data structure 1510 may include traffic types, which may be used by QoS agent 1415 to determine whether a particular DSCP value should be applied to traffic. For example, assume that QoS agent 1415 inspects traffic (e.g., a header and/or a payload of the traffic). The traffic may include identifiers and/or other information, based on which QoS agent 1415 may identify the traffic type. For example, traffic having indicators regarding particular video codecs may be identified as video conferencing traffic. As another example, traffic including HTTP requests may be identified as web browsing traffic. As yet another example, traffic may include explicit identifiers (e.g., standard identifiers and/or proprietary, non-standard identifiers) that indicate the type of the traffic. QoS agent 1415 may, in some implementations, mark traffic with DSCP values according to the identified traffic type.

Data structure 1520 may include traffic types, as well as application identifiers, which may be used by QoS agent 1415 to determine whether a particular DSCP value should be applied to traffic. Using the information in data structure 1520, QoS agent 1415 may apply different DSCP values to different traffic types outputted by the same application. On the other hand, QoS agent 1415 may apply different DSCP values to the same traffic type outputted by different applications. For example, as shown, QoS agent 1415 may apply a DSCP value of "EF" to voice calls outputted by the application "Skipe," but may apply a DSCP value of "AF41" to instant messaging traffic outputted by the application "Skipe."

Returning to FIG. 14, traffic, associated with some applications (e.g., application 1410-6) may not be inspected by a particular QoS agent 1415. For instance, application 1410-6 may be a native application associated with device 1400, may not be specifically associated with a particular QoS agent 1415, etc. In some implementations, application 1410-6 may mark traffic with a DSCP value.

DSCP-QCI component 1420 may include, and/or may be communicatively coupled to, hardware circuitry and/or logic that outputs traffic from DSCP-QCI component 1420. For example, DSCP-QCI component 1420 may include, and/or may be communicatively coupled to, one or more LTE radio transceivers.

DSCP-QCI component 1420 may receive DSCP-marked traffic (e.g., from one or more QoS agents 1415 and/or applications 1410), and may determine a QCI associated with the DSCP values in the DSCP-marked traffic. For instance, DSCP-QCI component 1420 may store information similar to data structures 300 and 350, described above with respect to FIGS. 3A and 3B. DSCP-QCI component 1420 may, in some implementations, perform functionality similar to that described above, in conjunction with FIG. 7A, with respect to user device 205. For instance, DSCP-QCI component 1420 may select a particular LTE bearer, via which to output traffic, based on the LTE bearer being associated with the appropriate QCI value.

For example, assume that two LTE bearers have been established between device 1400 and a RAN/core network (e.g., between device 1400 and PGW 230), one having a QCI value of 1 and the other having a QCI value of 7. Further assume that DSCP-QCI component 1420 receives DSCP-marked traffic from QoS agent 1415, and determines that the DSCP value associated with the traffic corresponds to a QCI value of 1. Based on this determination, DSCP-QCI component 1420 may output the traffic over the LTE bearer having the QCI value of 1 (e.g., in a similar fashion as described above with respect to, for example, FIG. 7A).

Figure 16:
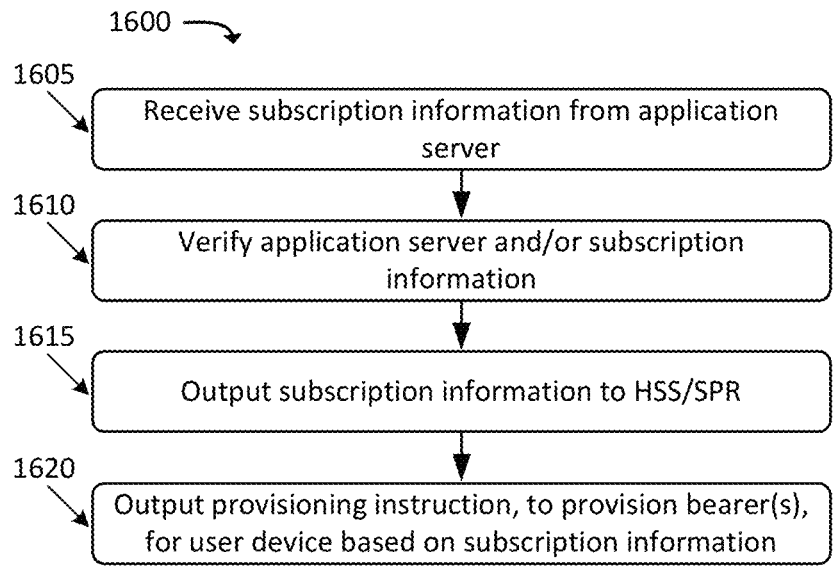
FIG. 16 illustrates an example process for the initial provisioning of one or more bearers for traffic between a user device and a particular application server, in accordance with some implementations.

FIG. 16 illustrates an example process 1600 for provisioning one or more bearers (e.g., LTE bearers) for a user device based on a subscription associated with the user device and an application server. Process 1600 may, in some implementations, be performed by provisioning interface 265. In other implementations, some or all of process 1600 may be performed by one or more other devices.

As shown, process 1600 may include receiving subscription information from an application server (block 1605). For example, as discussed above, provisioning interface 265 may receive subscription information from application server 260, regarding a subscribed QoS level associated with traffic sent and/or received to and/or from application server 260 by a particular user device 205. In some implementations, the subscription information may specify a link layer QoS (e.g., a QCI value) and/or another QoS value (e.g., an MPLS CoS value). In some implementations, the subscription information may include another QoS identifier or description, based on which provisioning interface 265 may identify a link layer QoS and/or an MPLS CoS value.

For example, the subscription information may specify a "gold" level, based on which provisioning interface 265 may identify a relatively low QCI value (where lower QCI values generally relate to "better" or more desirable levels of service, such as lower latency, higher throughput, lower packet drop rates, etc.). As another example, the subscription information may specify a "silver" level, based on which provisioning interface 265 may identify a higher QCI value than would be associated with the "gold" level.

As also described above, the subscription request, sent by application server 260, may also coincide with the providing of one or more QoS agents to user device 205, to which the subscription applies. For example, application server 260 (or another device) may provide the QoS agent to user device 205 when outputting the subscription information to provisioning interface 265. Additionally, or alternatively, application server 260 (or another device) may provide the QoS agent to user device 205 upon receiving confirmation from provisioning interface 265 that the subscription has been approved.

Process 1600 may also include verifying the application server and/or the subscription information (block 1610). For example, provisioning interface 265 may verify whether application server 260 has been authorized to request the provisioning of bearers on behalf of user devices 205, and/or whether the application server 260 has been authorized to request the specified QoS levels indicated in the subscription information (received at block 1605). For instance, provisioning interface 265 may verify whether application server 260 is a "trusted" device and/or is associated with a "trusted" owner and/or operator. Provisioning interface 265 may, for instance, request and/or receive authentication information (such as a password, an encrypted key, etc.) from application server 260 in order to verify application server 260 and/or the subscription information.

Process 1600 may further include outputting the subscription information to an HSS/SPR (block 1615). For instance, provisioning interface 265 may output the subscription information to HSS/SPR 235, and/or information derived from the subscription information. Specifically, for instance, provisioning interface 265 may output information identifying user device 205, application server 260, and the QoS level(s) (e.g., QCI value(s)) that should be applied to traffic sent between user device 205 and application server 260. The information, stored by HSS/SPR 235, may be used by other network devices (e.g., PGW 230 and/or PCRF 240) in order to identify which bearer(s) should be used to send and/or receive traffic to and/or from user device 205. Examples of how this information may be used are discussed above with respect to, for instance, FIGS. 5A, 5B, 6A, 6B, and 7B.

Process 1600 may additionally include outputting a provisioning instruction, to provision one or more bearers, for the user device based on the subscription information (block 1620). For instance, provisioning interface 265 may output an instruction to PGW 230, which may cause PGW 230 to provision one or more bearers that correspond to the specified QCI values. Additionally, or alternatively, one or more other devices may cause PGW 230 to provision the one or more bearers, and/or PGW 230 may communicate with one or more devices in addition to, or in lieu of, PGW 230 in order to provision the one or more bearers. For example, PGW 230 may communicate with MME 225, HSS/SPR 235, and/or PCRF 240 as part of the bearer establishment procedure. In some such implementations, the information, provided to HSS/SPR 235 (at block 1615) may cause HSS/SPR 235 to output subscription information PCRF 240 (e.g., using DIAMETER messaging over an Sh interface), which may provide an instruction (e.g., using DIAMETER messaging over a Gx interface) to PGW 230 to establish the one or more bearers. PGW 230 may signal SGW 220 using GPRS Tunneling Protocol C ("GTP-C"), over an S5/S8 interface; SGW 220 may signal MME 225 over an S11 interface; and MME 225 may signal base station 215 (e.g., over an S1-MME interface) and user device 205 (e.g., over an S1-AP/NAS interface) to complete the bearer establishment.

In some implementations, the provisioning of the bearer(s) may be similar to some aspects of the signal flow shown in, for example, FIG. 7B. As mentioned above, the one or more bearers (provisioned at block 1620) may be dedicated non-GBR bearers. PGW 230 may maintain information regarding the established bearers, and may use the bearers when user device 205 attaches to a RAN associated with PGW 230.

Figure 17:
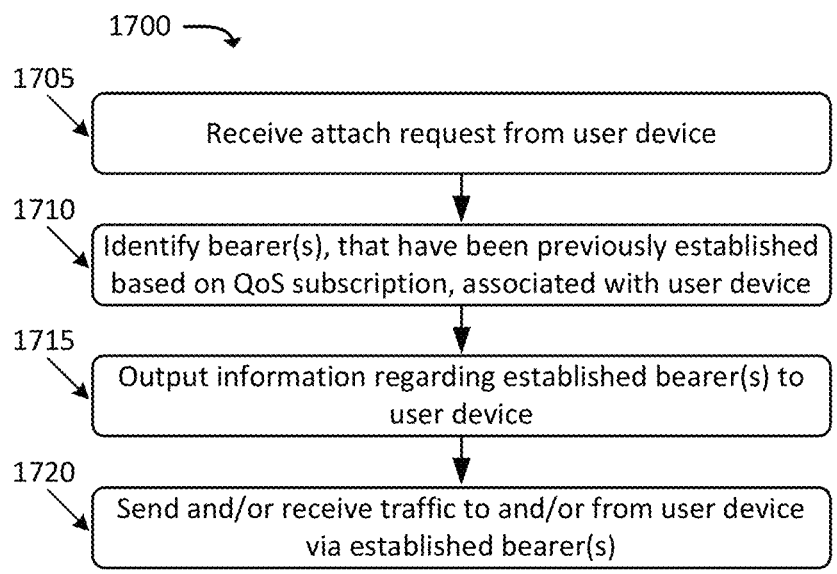
FIG. 17 illustrates an example process for sending and/or receiving traffic to and/or from a user device via particular bearers, based on a subscription associated with the user device and an application server to and/or from which the traffic is received.

FIG. 17 illustrates an example process 1700 for sending and/or receiving traffic via an established bearer, based on a QoS subscription associated with a user device. In some implementations, process 1700 may be performed by PGW 230. In other implementations, some or all of process 1700 may be performed by one or more other devices in addition to, or in lieu of, PGW 230.

As shown, process 1700 may include receiving an attach request from a user device (block 1705). For example, as described above, PGW 230 may perform an attachment procedure with user device 205.

Process 1700 may also include identifying one or more bearers, that have been previously established based on a QoS subscription, that are associated with the user device (block 1710). For instance, as mentioned above PGW 230 may maintain information regarding previously provisioned dedicated non-GBR bearers that have been established on behalf of user device 205 (e.g., bearers provisioned at block 1620).

Process 1700 may further include outputting information regarding the one or more established bearers to the user device (block 1715). For example, PGW 230 may output the information to user device 205, in order to set up the bearers for use by user device 205. In some implementations, PGW 230 may change a status of the one or more bearers from an idle mode to an active mode, based on the attachment.

Process 1700 may also include sending and/or receiving traffic to and/or from the user device via the established one or more bearers (block 1720). For instance, as described above, PGW 230 may receive traffic, from user device 205, via a particular bearer that user device 205 selected based on a DSCP value associated with the traffic (e.g., as marked by a QoS agent or other application associated with user device 205), and/or based on other criteria (e.g., an identity of an application that outputted the traffic, a type of the traffic, etc.). PGW 230 may, in some implementations, apply an MPLS CoS to the traffic and may forward the traffic toward application server 260 in a manner similar to that described above (e.g., with respect to FIG. 5A).

In some situations, a provisioned dedicated bearer (e.g., as established by way of block 1620) may be de-provisioned (e.g., after a particular period of time has elapsed since traffic has been sent and/or received over the bearer). After the bearer is de-provisioned, a default bearer may remain between user device 205 and PGW 230. In some implementations, when DSCP-marked traffic is to be sent from user device 205, a bearer establishment procedure may be initiated, in order to establish a dedicated non-GBR bearer associated with a QCI that corresponds to the DSCP marking of the traffic. However, before the dedicated non-GBR bearer is established, user device 205 may output the traffic over the default bearer. Once the dedicated non-GBR bearer is established, user device 205 may output the traffic over the dedicated non-GBR bearer.

Figure 18A:
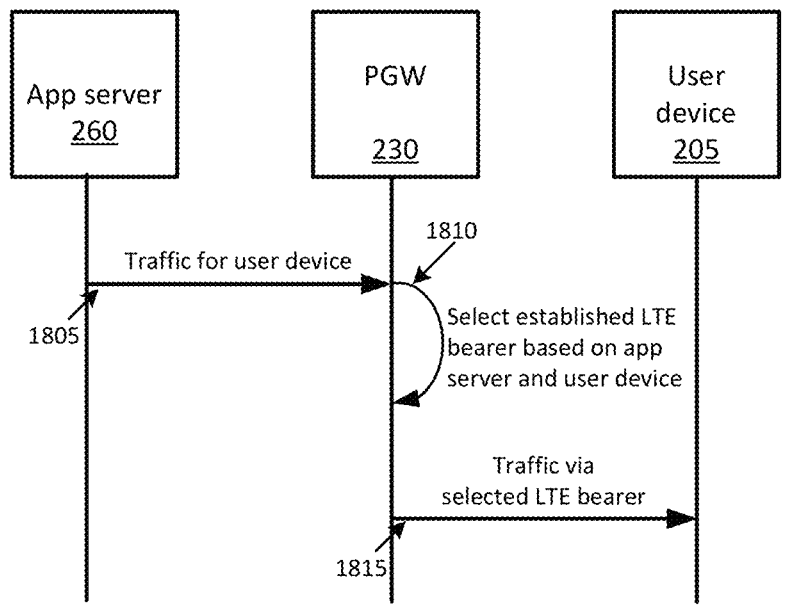
FIGS. 18A and 18B illustrate how traffic from an application server may be handled by a PGW, when the intended recipient is associated with a QoS subscription.
Figure 18B:
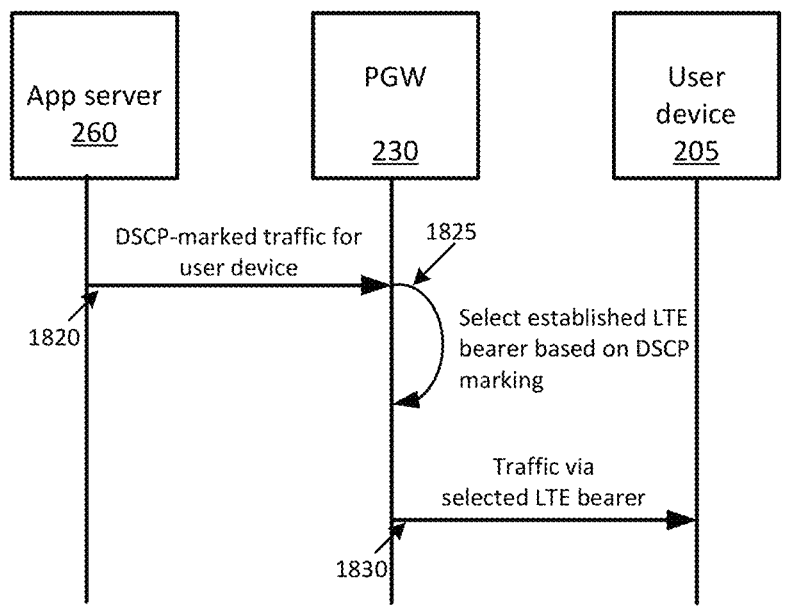

FIGS. 18A and 18B illustrate examples of how traffic, sent from application server 260, may be handled by PGW 230. For instance, as shown in FIG. 18A, PGW 230 may receive, at 1805 (e.g., via an edge router and/or one or more other devices, not shown), traffic, intended for user device 205, from application server 260. Assume that multiple LTE bearers have been established between user device 205 and a RAN associated with PGW 230.

PGW 230 may select (at 1810) a particular LTE bearer, based on subscription information that indicates a particular QCI value for traffic sent to user device 205 from application server 260. For example, PGW 230 may inspect the traffic to identify that the sender of the traffic is application server 260, and that the intended recipient is user device 205, and may determine that user device 205 and application server 260 are associated with an established LTE bearer. Additionally, or alternatively, PGW 230 may identify, based on subscription information, that the type of traffic (e.g., voice traffic, streaming video traffic, etc.) should be sent via a bearer associated with a particular QCI value. PGW 230 may output (at 1815) the traffic, via the selected LTE bearer, to user device 205.

FIG. 18B illustrates another example implementation, in which application server 260 may output (at 1820) DSCP-marked traffic to PGW 230 (e.g., via an edge router and/or one or more other devices, not shown). As further shown, PGW 230 may select (at 1825) a previously established LTE bearer based on the DSCP marking. For instance, PGW 230 may store data structures similar to those discussed above with respect to FIGS. 3A and/or 3B, and may select bearers that have QCI values that correspond to the marked DSCP values. PGW 230 may output (at 1830) the traffic, via the selected LTE bearer, to user device 205.

Figure 19:
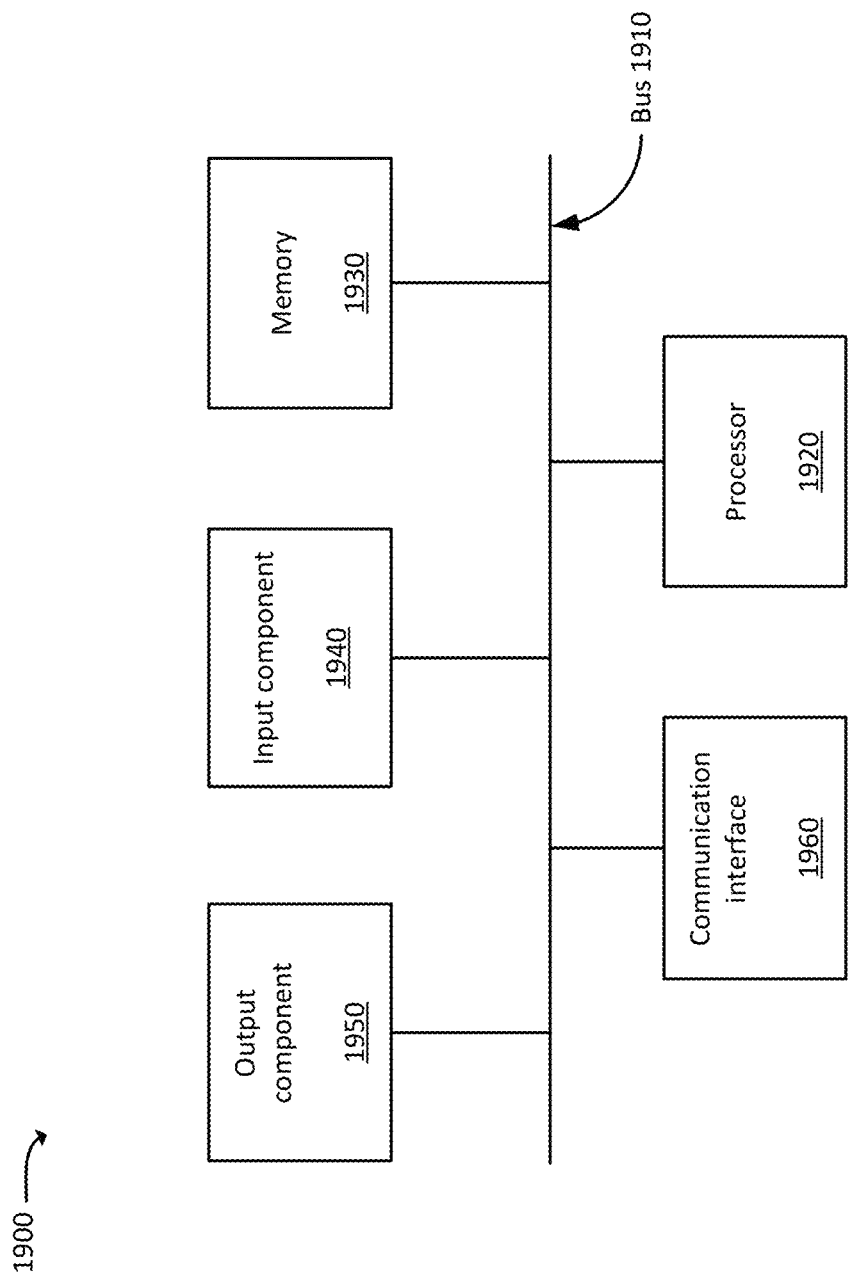
FIG. 19 illustrates example components of one or more devices, according to one or more implementations described herein.

FIG. 19 is a diagram of example components of device 1900. One or more of the devices described above (e.g., with respect to FIGS. 1A, 1B, 5A, 5B, 6A, 6B, 7A, 7B, 11A-11C, 13, 14, 18A, and 18B) may include one or more devices 1900. Device 1900 may include bus 1910, processor 1920, memory 1930, input component 1940, output component 1950, and communication interface 1960. In another implementation, device 1900 may include additional, fewer, different, or differently arranged components.

Bus 1910 may include one or more communication paths that permit communication among the components of device 1900. Processor 1920 may include a processor, microprocessor, or processing logic that may interpret and execute instructions. Memory 1930 may include any type of dynamic storage device that may store information and instructions for execution by processor 1920, and/or any type of non-volatile storage device that may store information for use by processor 1920.

Input component 1940 may include a mechanism that permits an operator to input information to device 1900, such as a keyboard, a keypad, a button, a switch, etc. Output component 1950 may include a mechanism that outputs information to the operator, such as a display, a speaker, one or more light emitting diodes ("LEDs"), etc.

Communication interface 1960 may include any transceiver-like mechanism that enables device 1900 to communicate with other devices and/or systems. For example, communication interface 1960 may include an Ethernet interface, an optical interface, a coaxial interface, or the like. Communication interface 1960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1900 may include more than one communication interface 1960. For instance, device 1900 may include an optical interface and an Ethernet interface.

Device 1900 may perform certain operations relating to one or more processes described above. Device 1900 may perform these operations in response to processor 1920 executing software instructions stored in a computer-readable medium, such as memory 1930. A computer-readable medium may be defined as a non-transitory memory device. A memory device may include space within a single physical memory device or spread across multiple physical memory devices. The software instructions may be read into memory 1930 from another computer-readable medium or from another device. The software instructions stored in memory 1930 may cause processor 1920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signals have been described with regard to FIGS. 5A-10 and 16-18B, the order of the blocks may be modified in other implementations. Further, non-dependent blocks may be performed in parallel.

Further, while examples above describe network layer QoS levels in terms of DSCP values and link layer QoS levels in terms of QCIs, in practice, other techniques of identifying QoS levels may be used. Additionally, while examples above describe inter-layer QoS enforcement in terms of the network layer, the link layer, and MPLS, in practice, QoS levels of other layers may be enforced from layer to layer using similar techniques.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. For example, while a direct connection is not shown, in FIG. 2, between ILQ engine 245 and PGW 230, in some implementations, ILQ engine 245 and PGW 230 may communicate without the intervention of PCRF 240. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    receiving, by one or more devices, subscription information regarding a particular user device, the subscription information specifying a quality of service ("QoS") level for traffic associated with the particular user device and a particular server device;
    outputting, based on receiving the subscription information, by the one or more devices, and to the particular user device, a QoS agent for installation at the particular user device, wherein when installed, the QoS agent modifies Differentiated Service ("DiffServ") Code Point ("DSCP") markings associated with traffic, to be outputted by the particular user device, to a DSCP marking associated with the QoS level specified in the subscription information;
    establishing, by the one or more devices, a set of bearers with the particular user device as part of an attachment procedure between the particular device and a base station of a wireless telecommunications network, the set of bearers including:
        a dedicated non-guaranteed bitrate ("non-GBR") bearer that is associated with a link layer QoS level that corresponds to the QoS level specified in the subscription information, and
        a default bearer;
    receiving, by the one or more devices and after the bearers have been established, traffic from the particular server device, the traffic being addressed to the particular user device;
    selecting, by the one or more devices, from the set of established bearers, and based on the subscription information, the dedicated non-GBR bearer that is associated with the link layer QoS level;

outputting, by the one or more devices, the traffic to the particular user device via the selected dedicated non-GBR bearer; and receiving, by the one or more devices and from the particular user device, subsequent traffic via the dedicated non-GBR bearer, wherein a DSCP marking associated with the subsequent traffic was applied by the QoS agent before the subsequent traffic was outputted from the particular user device.

2. The method of claim 1, wherein the subscription information is received from:
the particular server device, or
one or more other devices associated with an owner or operator of the particular server device.

3. The method of claim 1, wherein the link layer QoS level includes a Long Term Evolution ("LTE") QoS Class Identifier ("QCI").

4. The method of claim 1, wherein the one or more devices include a home subscriber server/subscriber profile repository ("HSS/SPR") and a policy charging and rules function ("PCRF"), and
wherein receiving the subscription information includes receiving, by the HSS/SPR, the subscription information;
the method further comprising outputting, from the HSS/SPR and to the PCRF, the subscription information,
wherein the establishing of the dedicated non-GBR bearer occurs based on the PCRF receiving the subscription information.

5. The method of claim 4, wherein the PCRF identifies the link layer QoS level based on the QoS level specified in the subscription information.

6. The method of claim 1, wherein traffic, from the particular user device and to the particular server device, is sent to the one or more devices via the dedicated non-GBR bearer.

7. A method, comprising:
requesting, by a user device, attachment to a wireless network;
receiving, by the user device and based on the attachment request, information regarding a set of bearers between the user device and the wireless network, the set of bearers including:
a first bearer associated with a first quality of service ("QoS") level, and
a second bearer associated with a second QoS level that is different from the first QoS level,
the first and second bearers having been established as part of the attachment between the user device and the wireless network;
receiving, by the user device and after the first and second bearers have been established, information indicating that traffic, associated with a particular set of applications, should be outputted via the first bearer;
identifying, by the user device, first traffic, from a first application, of the particular set of applications, that is to be outputted from the user device, the identifying including identifying a first Differentiated Service ("DiffServ") Code Point ("DSCP") marking associated with the first traffic;
identifying that the first DSCP marking is associated with the first QoS level;
modifying, based on the information indicating that traffic associated with the particular set of applications should be outputted via the first bearer, the first traffic to include a second DSCP marking in lieu of the first DSCP marking, the second DSCP marking being associated with the first QoS level;
outputting, by the user device and based on the second DSCP marking, the first traffic via the first bearer;
identifying, by the user device, second traffic, from a second application that is not in the particular set of applications, that is to be outputted from the user device; and
outputting, by the user device and based on identifying that the second traffic is not from the particular set of applications, the second traffic via the second bearer.

8. The method of claim 7, further comprising:
receiving information from a packet data network ("PDN") gateway ("PGW"), that links the first QoS level with the second DSCP marking.

9. The method of claim 8, wherein the information, that links the first QoS level with the second DSCP marking, is received as part of the requested attachment with the wireless network.

10. The method of claim 7, wherein the first and second QoS levels are link layer QoS levels.

11. The method of claim 10, wherein the link layer QoS levels include Long Term Evolution ("LTE") QoS Class Identifiers ("QCIs").

12. A user device, comprising:
a non-transitory memory device storing a set of processor-executable instructions; and
a processor configured to execute the set of processor-executable instructions, wherein executing the set of processor-executable instructions causes the processor to:
request attachment to a wireless network;
receive, based on the attachment request, information regarding a set of bearers between the user device and the wireless network, the set of bearers including:
a first bearer associated with a first quality of service ("QoS") level, and
a second bearer associated with a second QoS level that is different from the first QoS level,
the first and second bearers having been established based on the attachment request;
receive, after the first and second bearers have been established, information indicating that traffic, associated with a particular set of applications, should be outputted via the first bearer;
identify first traffic, from a first application, of the particular set of applications, that is to be outputted from the user device, the identifying including identifying a first Differentiated Service ("DiffServ") Code Point ("DSCP") marking associated with the first traffic;
identify that the first DSCP marking is associated with the first QoS level;
modify, based on the information indicating that traffic associated with the particular set of applications should be outputted via the first bearer, the first traffic to include a second DSCP marking in lieu of the first DSCP marking, the second DSCP marking being associated with the first QoS level;
output, based on the second DSCP marking, the first traffic via the first bearer;
identify second traffic, from a second application that is not in the particular set of applications, that is to be outputted from the user device; and output, based on identifying that the second traffic is not from the particular set of applications, the second traffic via the second bearer.

13. The user device of claim 12, wherein executing the set of processor-executable instructions, further causes the processor to receive information from a packet data network ("PDN") gateway ("PGW"), that links the first QoS level with the second DSCP marking.

14. The user device of claim 13, wherein the information, that links the first QoS level with the second DSCP marking, is received as part of the requested attachment with the wireless network.

15. The user device of claim 12, wherein the first and second QoS levels are link layer QoS levels.

16. The user device of claim 15, wherein the link layer QoS levels include Long Term Evolution ("LTE") QoS Class Identifiers ("QCIs").

* * * * *